(12) United States Patent
Outa

(10) Patent No.: US 11,577,794 B2
(45) Date of Patent: Feb. 14, 2023

(54) APPARATUS AND RELATED METHOD FOR COATING AN IRREGULAR SURFACE

(71) Applicant: Sector Industries, Inc., Deer Park, NY (US)

(72) Inventor: Ali Outa, Deer Park, NY (US)

(73) Assignee: Sector Industries, Inc., Deer Park, NY (US)

(*) Notice: Subject to any disclaimer, the term of this patent is extended or adjusted under 35 U.S.C. 154(b) by 249 days.

(21) Appl. No.: 16/197,419

(22) Filed: Nov. 21, 2018

(65) Prior Publication Data

US 2019/0152544 A1  May 23, 2019

Related U.S. Application Data

(60) Provisional application No. 62/707,900, filed on Nov. 22, 2017.

(51) Int. Cl.
| | |
|---|---|
| *B63B 59/10* | (2006.01) |
| *B62D 39/00* | (2006.01) |
| *B05C 5/02* | (2006.01) |
| *B05C 9/10* | (2006.01) |
| *B05C 11/10* | (2006.01) |
| *B08B 1/04* | (2006.01) |
| *B25J 5/00* | (2006.01) |
| *B60B 19/00* | (2006.01) |

(Continued)

(52) U.S. Cl.
CPC ............... *B62D 39/00* (2013.01); *B05C 5/02* (2013.01); *B05C 9/10* (2013.01); *B05C 11/10* (2013.01); *B08B 1/002* (2013.01); *B08B 1/04* (2013.01); *B25J 5/007* (2013.01); *B25J 11/0075* (2013.01); *B25J 11/0085* (2013.01); *B60B 19/003* (2013.01); *B60B 19/006* (2013.01); *B62D 57/024* (2013.01); *B62D 61/10* (2013.01); *B62D 63/02* (2013.01); *B63B 59/10* (2013.01); *B60G 3/18* (2013.01); *B60G 7/001* (2013.01)

(58) Field of Classification Search
CPC ... B63B 59/06; B63B 2059/065; B63B 59/08; B63B 2059/082; B63B 2059/085; B63B 2059/087; B63B 59/10; B25J 11/0075; B25J 11/008; B25J 11/0085; B25J 5/007; B60G 3/18; B60G 2200/14; B60G 3/26; B60G 7/00; B60G 7/001; B62D 39/00; B62D 55/116; B05C 5/02; B05C 9/10; B05C 11/10; B08B 1/002; B08B 1/04; B60B 19/003; B60B 19/006
See application file for complete search history.

(56) References Cited

U.S. PATENT DOCUMENTS 3,088,429 A    5/1963   Brandt
3,638,600 A *  2/1972   Modrey .................. B05C 1/00
                                                    114/222

(Continued)

*Primary Examiner* — Andrew Polay
(74) *Attorney, Agent, or Firm* — Edwin D. Schindler

(57) ABSTRACT

The robotic device conducts an action on a curved ferromagnetic surface. The robotic device includes a chassis platform and at least one magnetic side drive module. The chassis platform rolls on the curved ferromagnetic surface and is maintained thereon by virtue of the curved ferromagnetic surface being ferromagnetic. The at least one magnetic side drive module is pivotally attached to the chassis platform and is for conducting the action on the curved ferromagnetic surface as the chassis platform rolls on the curved ferromagnetic surface.

44 Claims, 20 Drawing Sheets

(51) Int. Cl.
*B08B 1/00* (2006.01)
*B62D 63/02* (2006.01)
*B62D 61/10* (2006.01)
*B25J 11/00* (2006.01)
*B62D 57/024* (2006.01)
*B60G 7/00* (2006.01)
*B60G 3/18* (2006.01)

(56) References Cited

U.S. PATENT DOCUMENTS

| | | | |
|---|---|---|---|
| 3,777,834 | A | 12/1973 | Hiraoka |
| 3,922,991 | A | 12/1975 | Woods |
| 4,029,164 | A | 6/1977 | Urakami |
| 5,947,051 | A * | 9/1999 | Geiger .................. B62D 57/00 114/222 |
| 7,076,335 | B2 * | 7/2006 | Seemann ............... B62D 55/00 700/248 |
| 8,393,421 | B2 | 3/2013 | Kornstein |
| 9,321,306 | B2 | 4/2016 | Outa |
| 9,586,636 | B1 | 3/2017 | Burmeister |
| 2013/0340529 | A1 * | 12/2013 | Lama .................. G01N 29/226 73/584 |
| 2014/0230711 | A1 | 8/2014 | Lovelace |
| 2015/0151572 | A1 | 6/2015 | Parrott |
| 2015/0151797 | A1 * | 6/2015 | Outa ..................... B62D 53/02 180/20 |
| 2015/0153312 | A1 | 6/2015 | Gonzalez |

\* cited by examiner

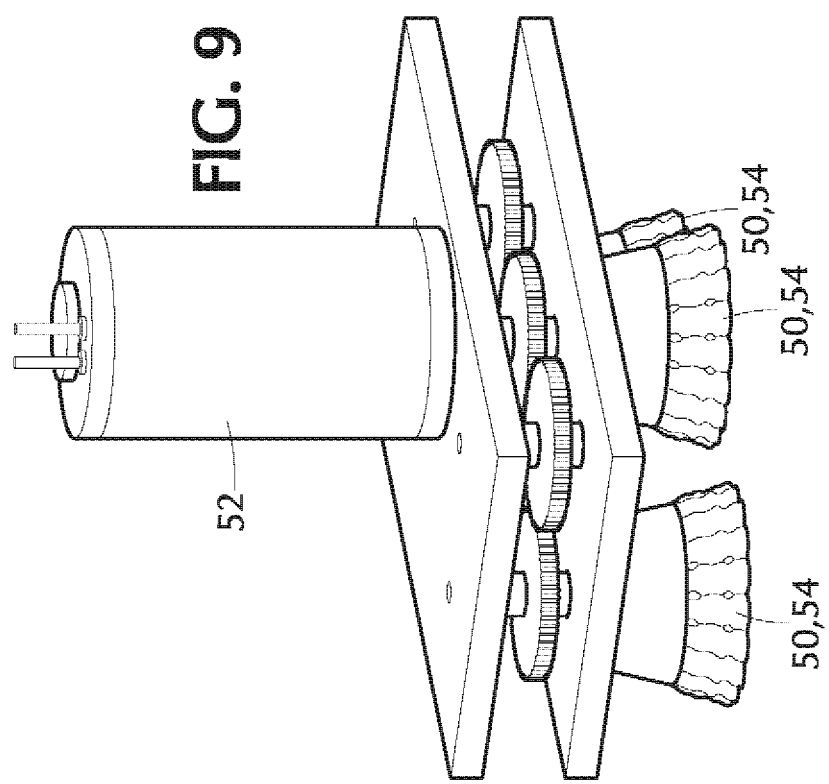
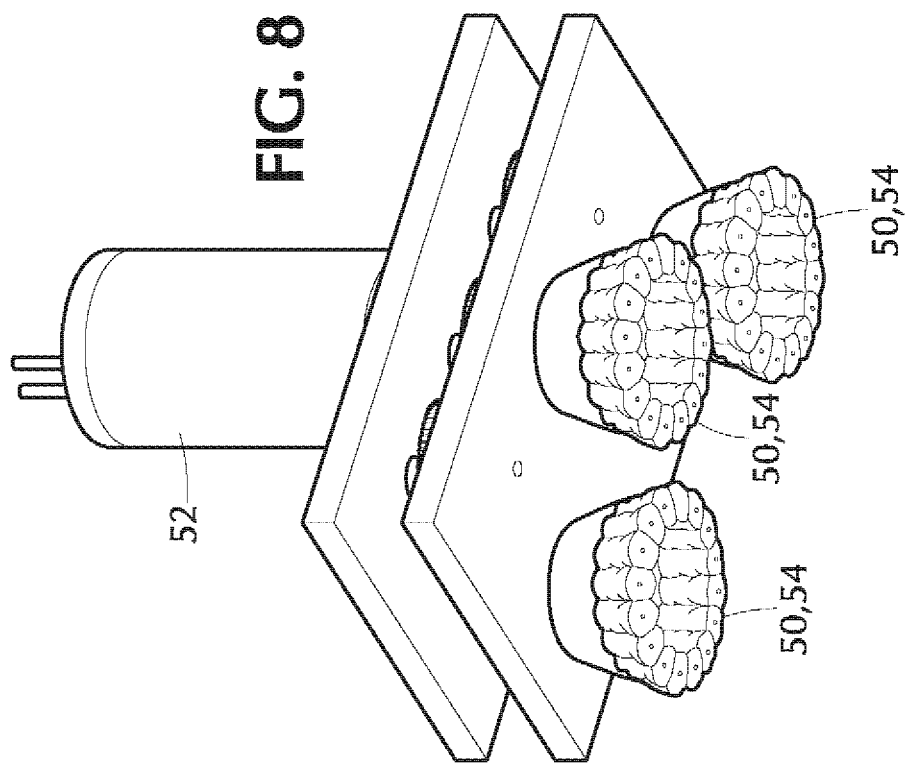

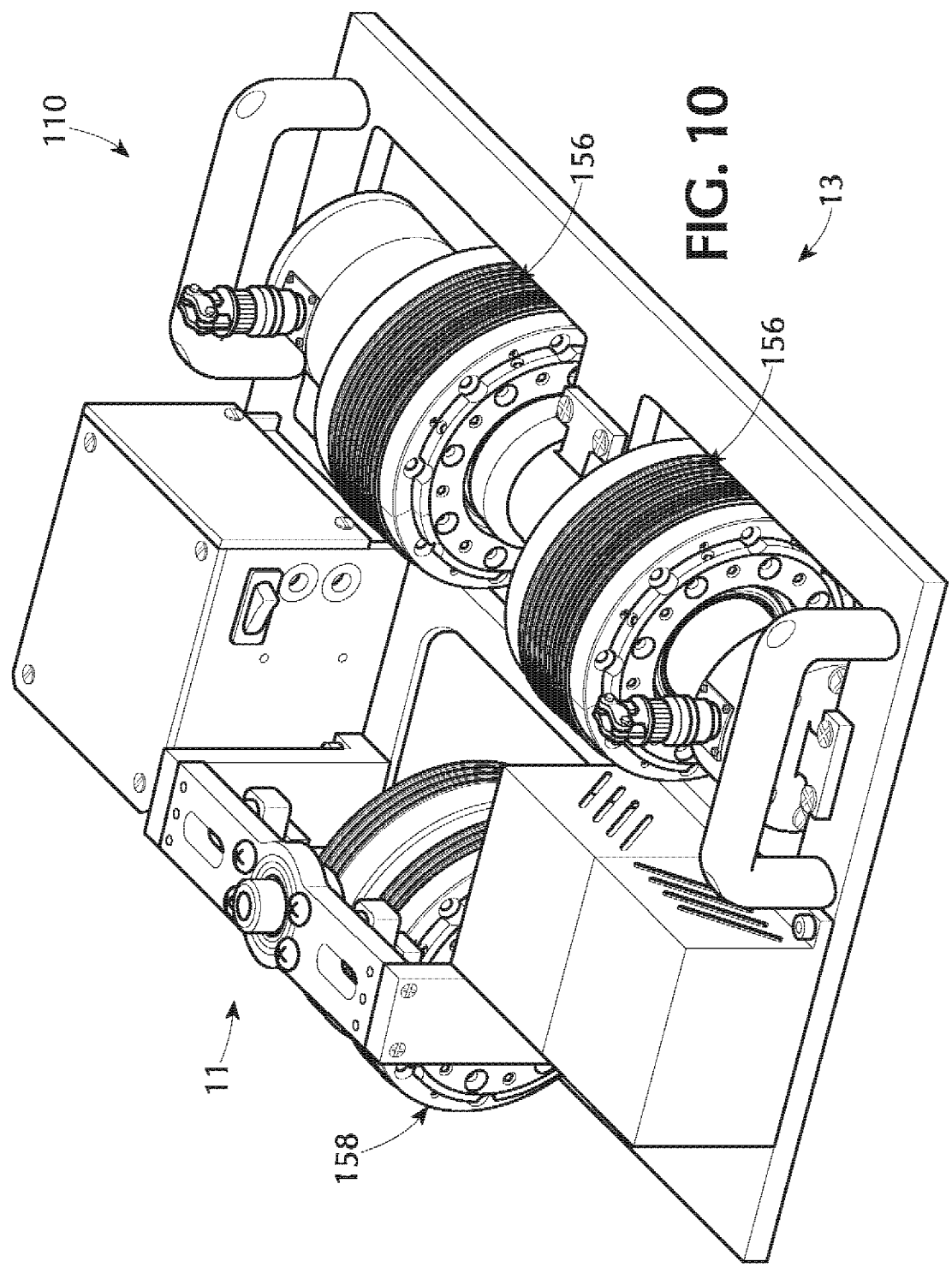

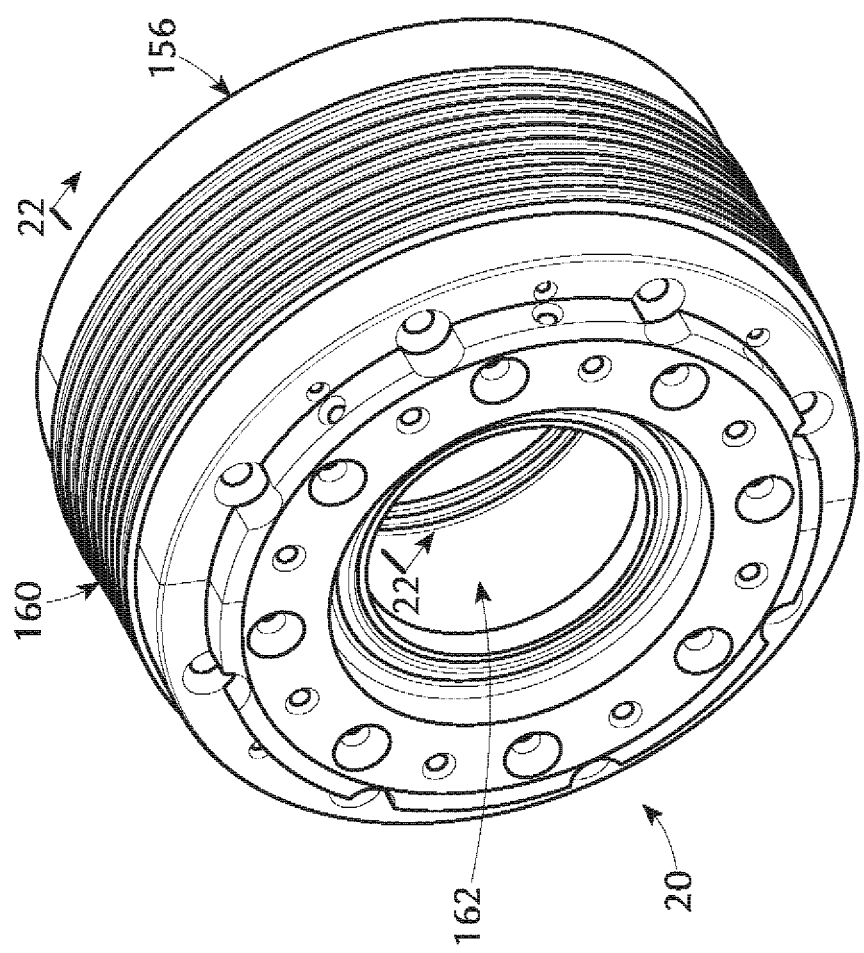

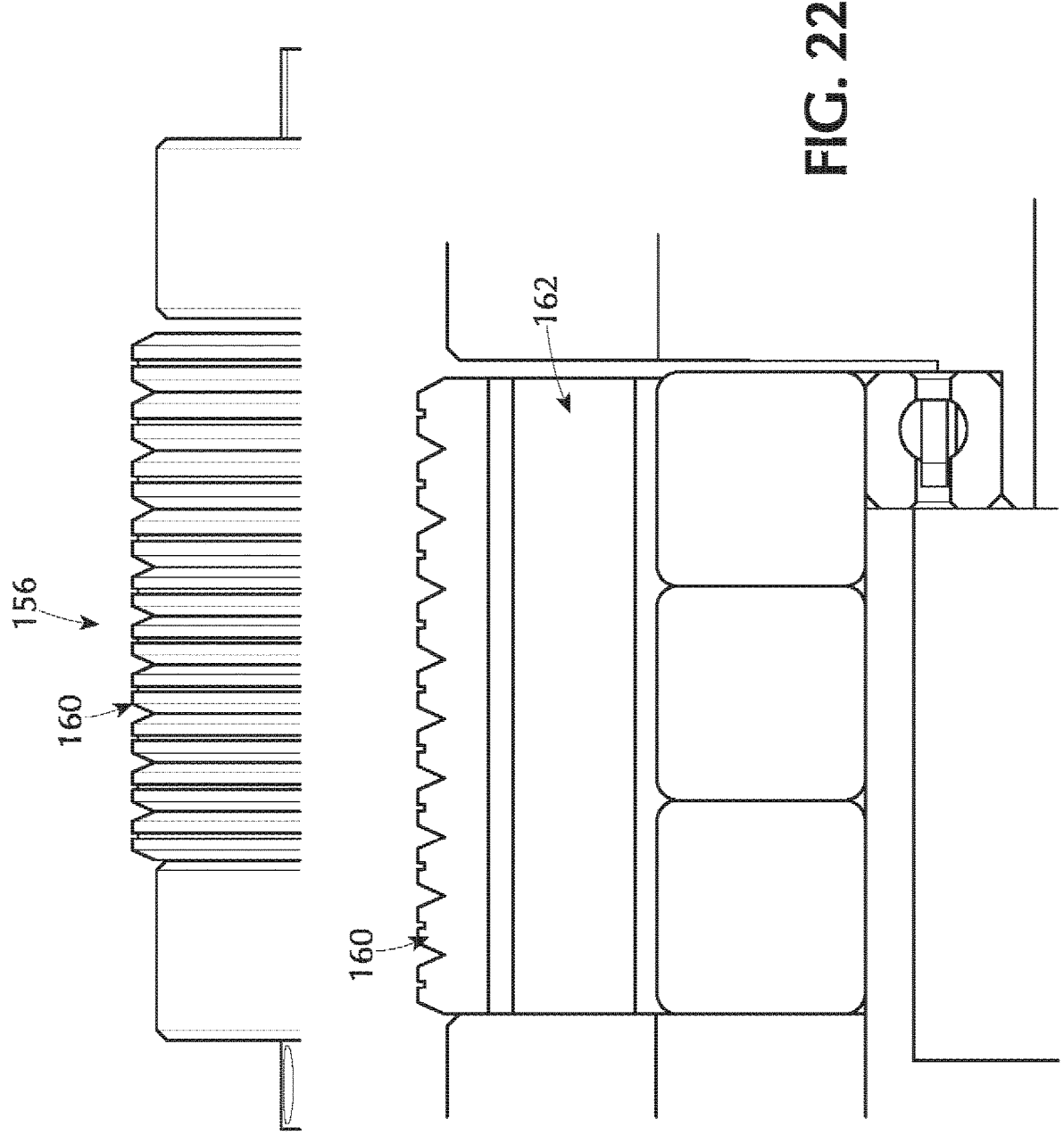

APPARATUS AND RELATED METHOD FOR COATING AN IRREGULAR SURFACE

CROSS REFERENCE TO RELATED APPLICATIONS

The instant non-provisional patent application claims priority from provisional patent application No. 62/707,900, filed on 22 Nov. 2017, for a ROBOTIC DEVICE FOR CONDUCTING AN ACTION ON A CURVED FERROMAGNETIC SURFACE, and incorporated herein in its entirety by reference thereto.

BACKGROUND OF THE INVENTION

Field of the Invention

The embodiments of the present invention relate to a robotic device, and more particularly, the embodiments of the present invention relate to a robotic device for conducting an action on a curved ferromagnetic surface.

Description of the Prior Art

The concept of using magnets and magnetic wheels to navigate on ferromagnetic structures has been actively explored by various inventors, and robotic and inspection technology companies. Cylindrical and spherical ferromagnetic structures constitute a challenge due to the curvature that can be either convex or concave and hence difficult to navigate on using suctions cups and vacuum adhesion mechanisms.

Numerous innovations for ferromagnetic robotic devices have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a robotic device for conducting an action on a curved ferromagnetic surface.

U.S. Pat. No. 3,088,429 to Brandt

U.S. Pat. No. 3,088,429—issued to Brandt on May 7, 1963—teaches cleaning devices for removing marine growth from ship hulls, which are of the type incorporating rotatable roller brushes and rotatable magnetic rollers, through the medium of which the device may be kept in running contact, with the hull of the ship to be cleaned. A cleaning device of the aforementioned type can adjust itself readily to compensate for minor unevennesses and curvatures of a ship's hull.

U.S. Pat. No. 3,777,834 to Hiraoka

U.S. Pat. No. 3,777,834—issued to Hiraoka on Dec. 11, 1973—teaches a magnet vehicle supportably adhered to, and adapted to run over, an inclined wall surface of a structural member made of a strong magnetic material, such as, iron and steel. The vehicle can be altered in its direction of travel as desired on the surface.

U.S. Pat. No. 3,922,991 to Woods

U.S. Pat. No. 3,922,991—issued to Woods on Dec. 2, 1975—teaches an apparatus for cleaning relatively large, flat, and ferro-metallic surfaces of corrosion, scale, paint, and undesirable marine growths. The apparatus has a high pressure fluid blasting assembly, a magnetic attachment device, a driving motor, and a signal generating and receiving system for guiding the apparatus along the surface to be cleaned.

U.S. Pat. No. 4,029,164 to Urakami

U.S. Pat. No. 4,029,164—issued to Urakami on Jun. 14, 1977—teaches a movable apparatus adhering to the surface of a wall. The movable apparatus is capable of moving continuously and smoothly on the hull of a ship or the wall of a modern architectural structure, such as, a sky-scraper without the danger of falling.

U.S. Pat. No. 8,393,421 to Kornstein

U.S. Pat. No. 8,393,421—issued to Kornstein on Mar. 12, 2013—teaches a hull robot that includes a robot body, at least one drive module for maneuvering the robot about the hull, an on-board power source, and a motive subsystem for the drive module powered by the on-board power source. A plurality of permanent magnet elements are associated with the drive module and each are switchable between a non-shunted state when adjacent the hull and a shunted state when not adjacent the hull.

U.S. Pat. No. 9,321,306 to Outa

U.S. Pat. No. 9,321,306—issued to Outa on Apr. 26, 2016—teaches a robotic vehicle chassis. The robotic vehicle chassis includes a first chassis section, a second chassis section, and a hinge joint connecting the first and second chassis sections so that the first and second chassis sections are capable of rotation with respect to each other in at least a first direction. The vehicle includes a drive wheel mounted to one of the first and second chassis sections and an omni-wheel mounted to the other of the first and second chassis sections. The omni-wheel is mounted at an angle orthogonal with respect to the drive wheel. The hinge joint rotates in response to the curvature of a surface the vehicle is traversing.

U.S. Pat. No. 9,586,636 to Burmeister

U.S. Pat. No. 9,586,636—issued to Burmeister on Mar. 7, 2017—teaches a system that includes a first drive module connected to a first end of a linkage arm and a second drive module connected to a second end of the linkage arm. Two magnetic wheels are connected to each of the first and second drive modules. The first and second drive modules may be independently controlled or controlled using a coordinated controller. The linkage arm may include a first linkage arm portion having at least one degree of freedom with respect to a connected second linkage arm portion that may be connected via a hinged or ball joint connection. One or both ends of the linkage arm may have at least one degree of freedom with respect to its connected drive module. Additional linkage arms and drive modules may be connected to form a multi-segment system.

United States Patent Application Publication Number 2014/0230711 to Lovelace United States Patent Application Publication Number 2014/0230711—published to Lovelace on Aug. 21, 2014—teaches a chassis that clings to a ship hull or other ferrous surfaces by a magnet that moves toward or away from the surface to adjust the magnet air gap and thus the attractive force. The magnet(s) can be the only clinging force or can use other sources, such as, a suction chamber or a fluid jet drive. An internal magnet on a crank mechanism can pivot around a wheel rotation axis inside a wheel body having a non-ferrous traction surface or tire. The magnet gap is least at an angle perpendicular to the surface on which the wheel rests, and larger at an angle oblique to that, for varying the attractive force to two or more levels. The vehicle can be an autonomous hull maintenance device with sensors, controllers, and actuators to sense, measure, and clean away fouling.

United States Patent Application Publication
Number 2015/0151572 to Parrott

United States Patent Application Publication Number 2015/0151572—published to Parrott on Jun. 4, 2015—teaches a multidirectional wheel for traversing a surface that includes at least one hub. The hub defines a first axial direction of rotation. A plurality of rollers are disposed around an outer periphery of the hub. The rollers are mounted for rotation in a second axial direction that is at an angle to the first axial direction. The wheel includes at least one magnet that is mounted to the hub. The hub is made of a magnetically inducible material that concentrates the flux of the at least one magnet toward the surface being traversed.

United States Patent Application Publication
Number 2015/0153312 to Gonzalez

United States Patent Application Publication Number 2015/0153312—published to Gonzalez on Jun. 4, 2015—teaches a modular inspection vehicle having at least first and second motion modules. The first and second motion modules are connected to a chassis. The first motion module includes a first wheel mounted to the chassis. The second motion module includes a second wheel mounted to the chassis. The second wheel is at an angle to the first wheel. The vehicle further includes a navigation module configured to collect position data related to the position of the vehicle, an inspection module configured to collect inspection data related to the vehicle's environment, and a communication module configured to transmit and receive data. The vehicle can also include a control module configured to receive the inspection data and associate the inspection data with received position data that corresponds to the inspection data collected at a corresponding position for transmission via the communication module.

Japanese Patent Number JPS54131209A to Kubota

Japanese Patent Number JPS54131209A—issued to Kubota on Oct. 12, 1979—teaches enabling free motion on the surface of a magnetic substance, such as, a pipe and an atomic pile pressure vessel by forming right and left front wheels and right and left rear wheels to be foldable toward a body.

Chinese Patent Number Cn103303384 to Wu

Chinese Patent Number CN103303384—issued to Wu on Jul. 29, 2015 teaches a flexible surface crawler that includes a fixed member. The fixed member is located on one side of a pair of first clamping wheels. The wheel of the first clamping member, relative to the fixed and located on the other side, is a pair of second pinch wheels. The first clamping drive wheel is rotatable by the first motor and the second motor drives the second clamping wheel rotation. By two pairs of clamping wheel holders are for creeper work, the flexible surface crawlers crawling direction, and the line is bent at the flexible material will form the clamp at the perpendicular, greatly overcoming the flexible surface crawlers from being creeper risk.

It is apparent that numerous innovations for ferromagnetic devices have been provided in the prior art, which are adapted to be used. Furthermore, even though these innovations may be suitable for the specific individual purposes to which they address, however, they would not be suitable for the purposes of the embodiments of the present invention as heretofore described, namely, a robotic device for conducting an action on a curved ferromagnetic surface.

SUMMARY OF THE INVENTION

Thus, an object of the embodiments of the present invention is to provide a robotic device for conducting an action on a curved ferromagnetic surface, which avoids the disadvantages of the prior art.

The embodiments of the present invention are for mounting an actuated magnetic wheel whereby the wheel is passively adjusted on magnetically inducible material forming curved surfaces. Several alterations/embodiments of using the above-mentioned mounting mechanism include maximizing the adhesion force to the surface, while on the other hand, minimizing friction that will otherwise scratch and damage the surface.

Briefly stated, another object of the embodiments of the present invention is to provide a robotic device that conducts an action on a curved ferromagnetic surface. The robotic device includes a chassis platform and at least one magnetic side drive module. The chassis platform traverses the curved ferromagnetic surface, and is maintained thereon by virtue of the curved ferromagnetic surface being ferromagnetic. The at least one magnetic side drive module is pivotally attached to the chassis platform and is for conducting the action on the curved ferromagnetic surface as the chassis platform traverses the curved ferromagnetic surface.

The novel features considered characteristic of the embodiments of the present invention are set forth in the appended claims. The embodiments of the present invention themselves, however, both as to their construction and to their method of operation, together with additional objects and advantages thereof, will be best understood from the following description of the embodiments of the present invention when read and understood in connection with the accompanying figures of the drawing.

BRIEF DESCRIPTION OF THE FIGURES OF THE DRAWING

The figures of the drawing are briefly described as follows:

FIG. 8 is a diagrammatic perspective view of motorized brushes for maximizing a cleaning area with overlapping coverage;

FIG. 9 is a diagrammatic perspective view of motorized brushes for maximizing cleaning area with overlapping coverage;

FIG. 10 is a diagrammatic front perspective view of an alternate embodiment of the robotic device;

FIG. 19 is a diagrammatic perspective view of the one passive magnetic caster wheel being rubberized and showing the freely rotating parts and rubber knurls that make contact before the steel yokes to prevent scratching while improving traction;

FIG. 22 is a diagrammatic cross sectional view taken along LINE 22 in FIG. 19.

Figure 1:
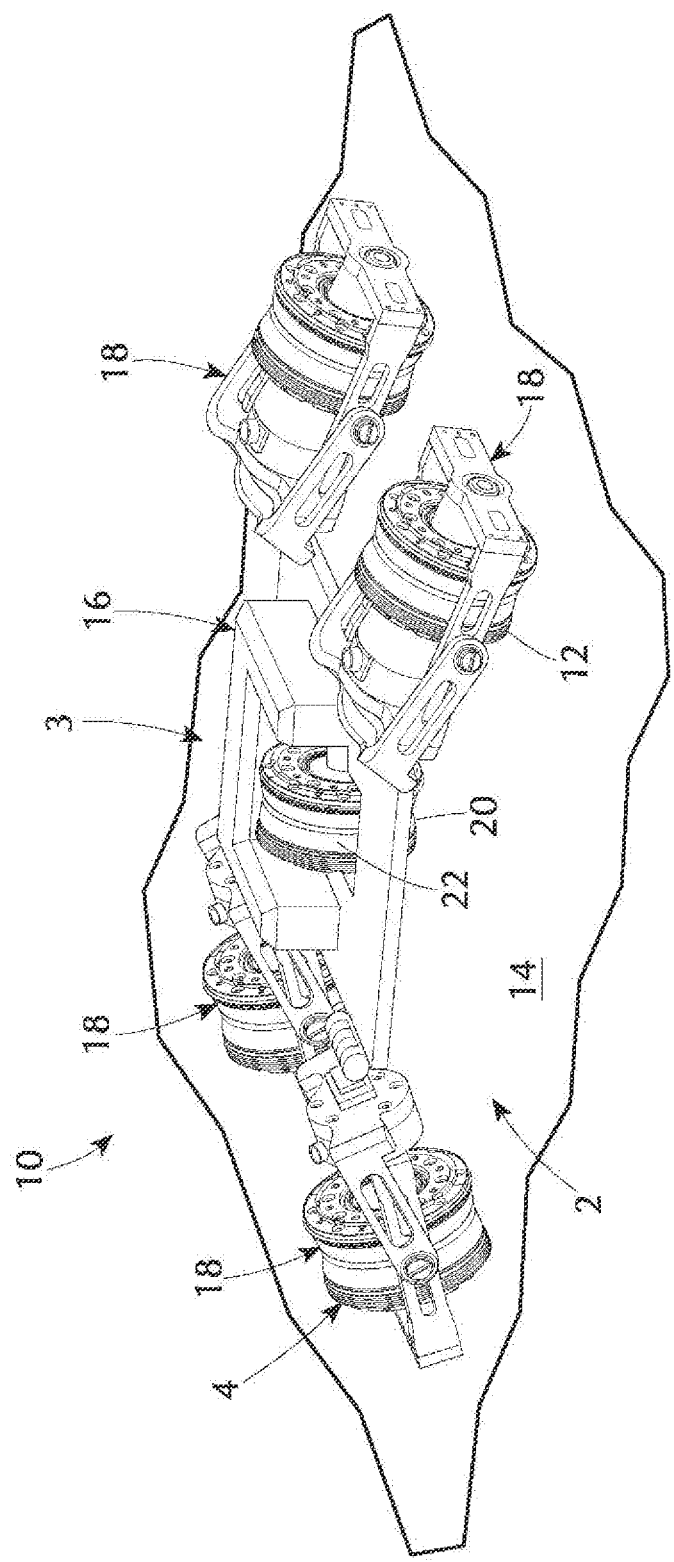
FIG. 1 is a diagrammatic perspective view of the robotic device of the embodiments of the present invention conducting an action on a curved ferromagnetic surface.

LIST OF REFERENCE NUMERALS UTILIZED
IN THE FIGURES OF THE DRAWING

Introductory 10 robotic device of embodiments of present invention for conducting action 12 on curved ferromagnetic surface 14
12 action
14 curved ferromagnetic surface Overall Configuration of Robotic Device 10

16 chassis platform for traversing curved ferromagnetic surface 14
18 at least one magnetic side drive module for conducting action 12 on curved ferromagnetic surface 14 as chassis platform 16 rolls on curved ferromagnetic surface 14

Specific Configuration of Chassis Platform 16

20 additional magnetic wheel of chassis platform 16
22 freely rotating yoke of additional magnetic wheel 20 of the chassis platform 16

Specific Configuration of at Least One Magnetic
Side Drive Module 18

24 magnetic side drive wheel of at least one magnetic side drive module 18
26 actuating motor of at least one magnetic side drive module 18
28 first yoke of magnetic side drive wheel 24 of at least one magnetic side drive module 18
30 second yoke of magnetic side drive wheel 24 of at least one magnetic side drive module 18
32 ring magnets of least one magnetic side drive module 18
34 first bracket of at least one magnetic side drive module 18
36 second bracket of at least one magnetic side drive module 18
38 first hinge of at least one magnetic side drive module 18
40 first axis of rotation of at least one magnetic side drive module 18
42 second axis of rotation of at least one magnetic side drive module 18
44 third axis of rotation of at least one magnetic side drive module 18
46 middle symmetrical plane of magnetic side drive wheel 24 of at least one magnetic side drive module 18
48 second hinge of at least one magnetic side drive module 18

Accessories 50 at least one metallic wire brush
52 motor
54 suction mechanisms

Alternate Embodiment of Robotic Device 110

110 alternate embodiment of robotic device
156 two actuated magnetic wheels
158 one passive magnetic caster wheel
160 rubber of each of two actuated magnetic wheels 156
162 non-magnetic hub of each of two actuated magnetic wheels 156

DETAILED DESCRIPTION OF THE PREFERRED EMBODIMENTS

Introductory

Figure 2:
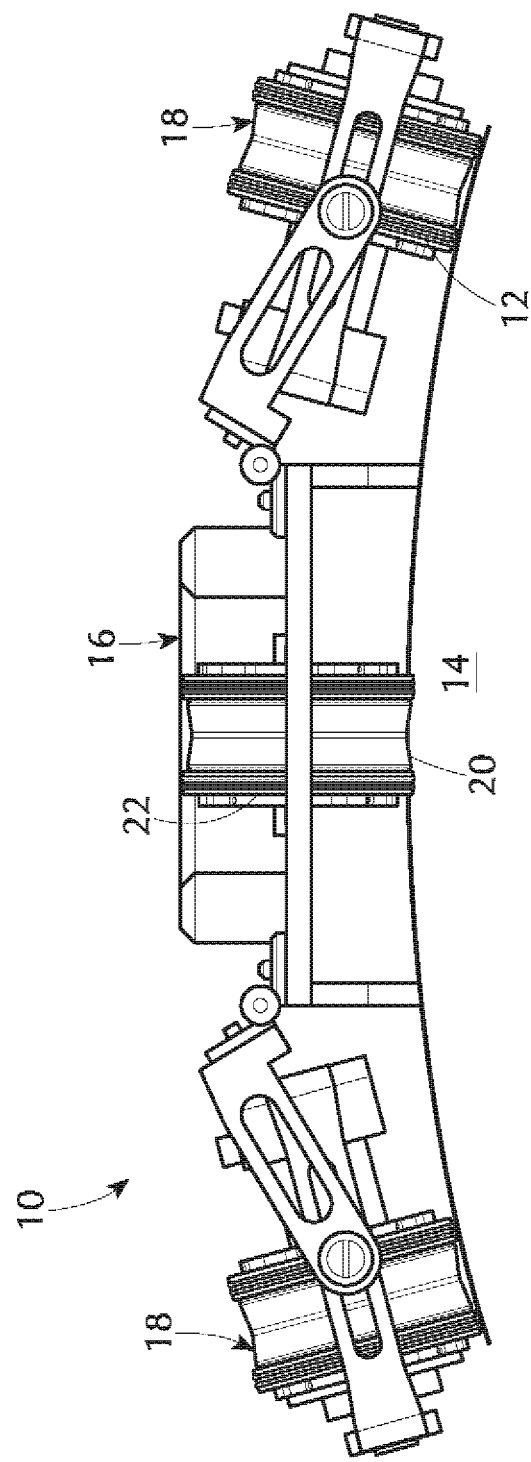
FIG. 2 is a diagrammatic perspective view taken in the direction of ARROW 2 in FIG. 1 of the robotic device of the embodiments of the present invention and conducting an action on a curved ferromagnetic surface.
Figure 3:
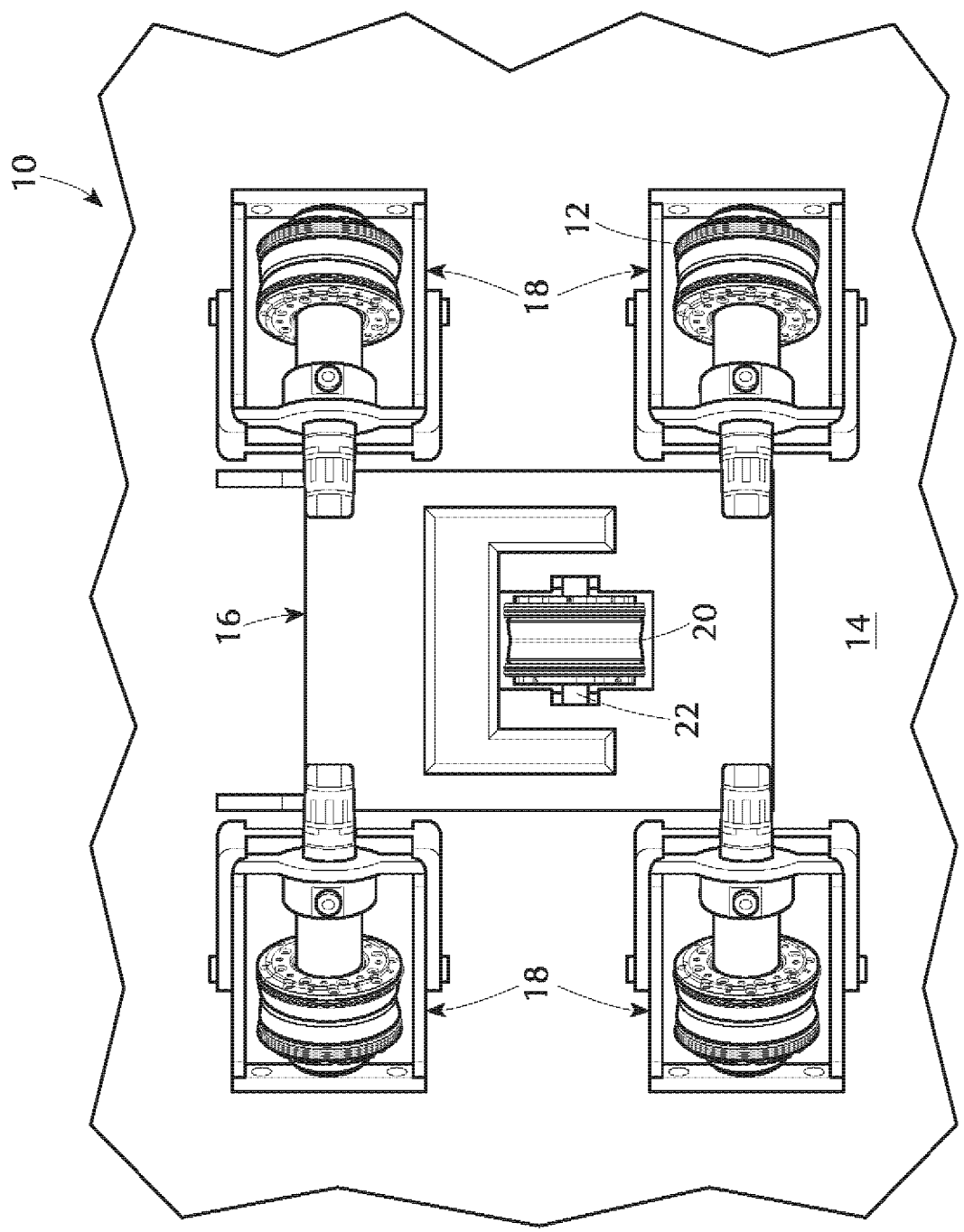
FIG. 3 is a diagrammatic top plan view taken in the direction of ARROW 3 in FIG. 1 of the robotic device of the embodiments of the present invention and conducting an action on a curved ferromagnetic surface.

Referring now to the figures, in which like numerals indicate like parts, and particularly to FIGS. 1-3, the robotic device of the embodiments of the present invention is shown generally at 10 for conducting an action 12 on a curved ferromagnetic surface 14.

The Overall Configuration of the Robotic Device 10

The overall configuration of the robotic device 10 can best be seen in FIGS. 1-3, and as such, will be discussed with reference thereto.

The robotic device 10 comprises a chassis platform 16 and at least one magnetic side drive module 18. The chassis platform 16 is for traversing the curved ferromagnetic surface 14, and is maintained thereon, by virtue of the curved ferromagnetic surface 14 being ferromagnetic. The at least one magnetic side drive module 18 is pivotally attached to the chassis platform 16 and is for conducting the action 12 on the curved ferromagnetic surface 14 as the chassis platform 16 rolls on the curved ferromagnetic surface 14.

The Specific Configuration of the Chassis Platform 16

The specific configuration of the chassis platform 16 can best be see in FIGS. 1-3, and as such, will discussed with reference thereto.

The chassis platform 16 has an additional magnetic wheel 20. The additional magnetic wheel 20 of the chassis platform 16 is passively mounted to rotate in a same direction as magnetic side drive wheels of the at least one magnetic side drive module 18 as they roll on the curved ferromagnetic surface 14.

The freely rotating yoke 22 allows the additional magnetic wheel 20 of the chassis platform 16 have easy rotation when the entire chassis platform 16 pivots around itself during steering.

The additional magnetic wheel 20 is mounted to pivot around its middle axis that is perpendicular to the curved and ferromagnetic surface 14 that it adheres to while also rolling on the curved and ferromagnetic surface 14. By adding the additional magnetic wheel 20, load carrying capacity of the chassis platform 16 is increased.

The additional magnetic wheel 20 is intended to set height of the chassis platform 16 while preventing sagging in its middle. This allows the chassis platform 16 to carry different functional modules that include, but are not limited to, cleaning, surface preparation, painting, coating, inspection, welding, and other repair jobs.

On a further note, the concept of using the chassis platform 16 for the purpose of cleaning and painting/coating water towers, both internally and externally, the chassis platform 16 needs to be light enough to be deployed by an operator who controls it remotely while it is crawling on top of the curved and ferromagnetic surface 14.

The chassis platform 16 is tethered or wireless. While the wireless option offers ease of navigation, the tethered operation allows carrying a jet of media blast of air or water for cleaning and a continuous supply of paint for coating and painting.

In the case of the tethered operation, the weight of the tether would be a burden on the robotic device 10, but would eliminate the need to have any power source on board of the chassis platform 16, as it is used to provide power and communication in addition to the cleaning and painting material.

Wireless operation is much more versatile in terms of being a completely self-contained device with interchangeable modules for various functions, but is constrained and limited by how much load the robotic device 10 is able to carry in terms of paint, for example. Additionally, the paint job is performed by a rolling paint roller or an electric paint spray. The paint is provided from a storage container on-board or tethered in the case of either operation.

Having the robotic device 10 for painting, coating, and cleaning saves a lot of money on hazardous labor and enhance safety and eliminate the need for erecting expensive and costly scaffolding.

The Specific Configuration of the a Least One Magnetic Side Drive Module 18

Figure 4:
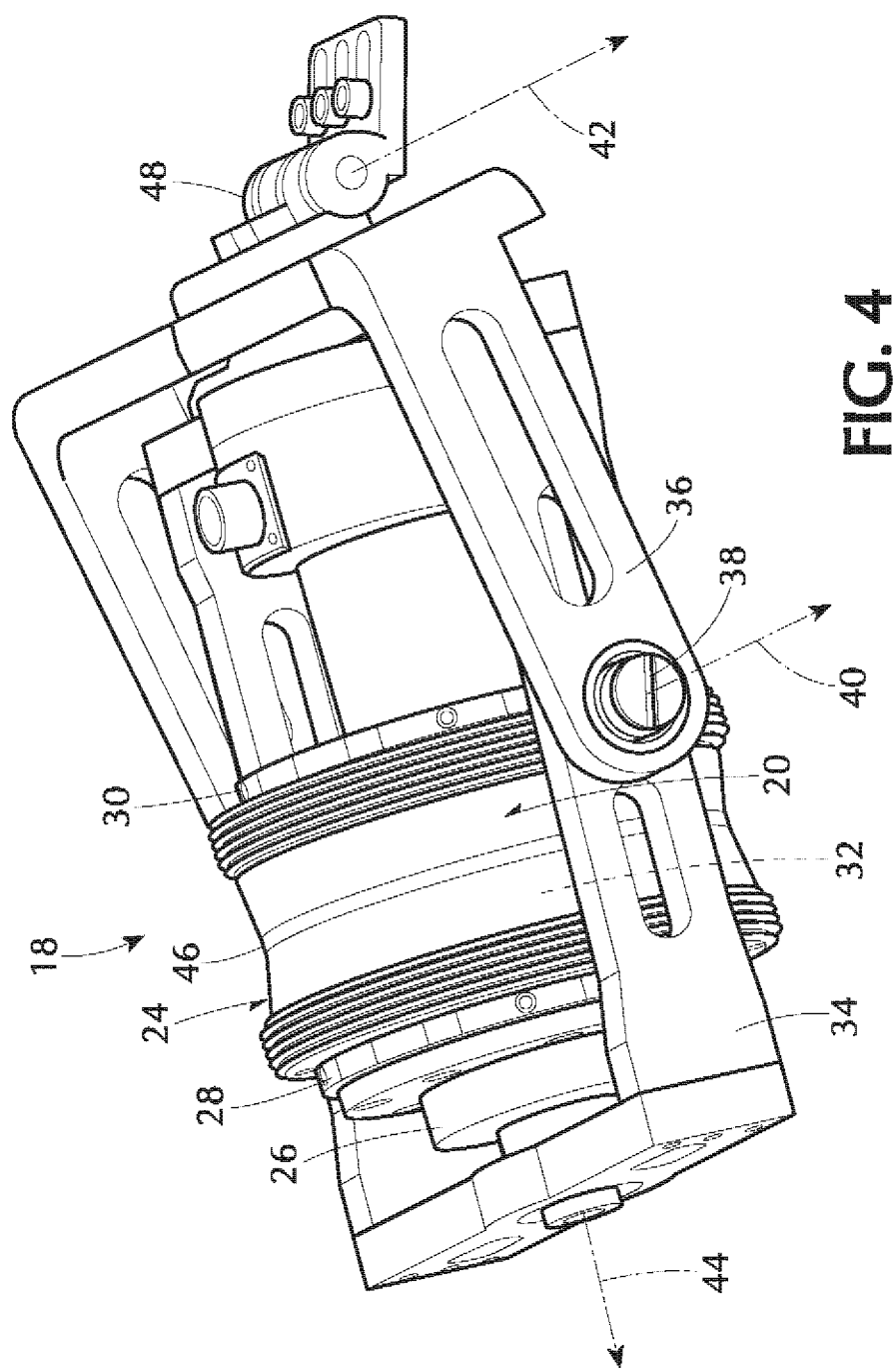
FIG. 4 is an enlarged diagrammatic perspective view of a drive module of the robotic device of the embodiments of the present invention identified by ARROW 4 in FIG. 1.

The specific configuration of the at least one magnetic side drive module 18 can best be seen in FIG. 4, and as such, will be discussed with reference thereto.

The at least one magnetic side drive module 18 comprises magnetic side drive wheels 24 that is coupled to an actuating motor 26. The actuating motor 26 is disposed to the far side of a first yoke 28 of the magnetic side drive wheel 24. A second yoke 30 of the magnetic side drive wheel 24 is either coupled or decoupled to passively rotate with respect to the first yoke 28 of the magnetic side drive wheel 24.

Ring magnets 32 of the least one magnetic side drive module 18 are disposed inside the magnetic side drive wheel 24 of the least one magnetic side drive module 18, between the first yoke 28 of the magnetic side drive wheel 24 and the second yoke 30 of the magnetic side drive wheel 24, and is attracted to the first yoke 28 of the magnetic side drive wheel 24.

In order to favor attraction to the first yoke 28 of the magnetic side drive wheel 24 over the second yoke 30 of the magnetic side drive wheel 24, the ring magnets 32 of the magnetic side drive wheel 24 are pushed toward the first yoke 28 of the magnetic side drive wheel 24 via spherical balls directly pressed with screws or spring loaded in order to ensure a gap between the second yoke 30 of the magnetic side drive wheel 24 and the ring magnets 32 of the magnetic side drive wheel 24.

The magnetic side drive wheel 24 is mounted on a first bracket 34 that pivots with respect to a second bracket 36 via a second hinge 48 on a first axis of rotation 40. The second bracket 36 is also hinged from the far side to pivot around a second axis of rotation 42. The first axis of rotation 40 and the second axis of rotation 42 are parallel to each other forcing the first bracket 34 and the second bracket 36 to pivot in a same vertical plane. The magnetic side drive wheel 24, however, pivot around a third axis of rotation 44 that is perpendicular to the first axis of rotation 40 and to the second axis of rotation 42.

Furthermore, the first axis of rotation 40 is as close as possible to a middle symmetrical plane 46 of the magnetic side drive wheel 24, between the first yoke 28 of the magnetic side drive wheel 24 and the second yoke 30 of the magnetic side drive wheel 24.

The at least one magnetic side drive module 18 is then hinged to the platform/chassis 16 that has at least one magnetic side drive module 18 mounted on each side and connected to a first hinge 38.

The Operation of the Robotic Device 10

Figure 5:
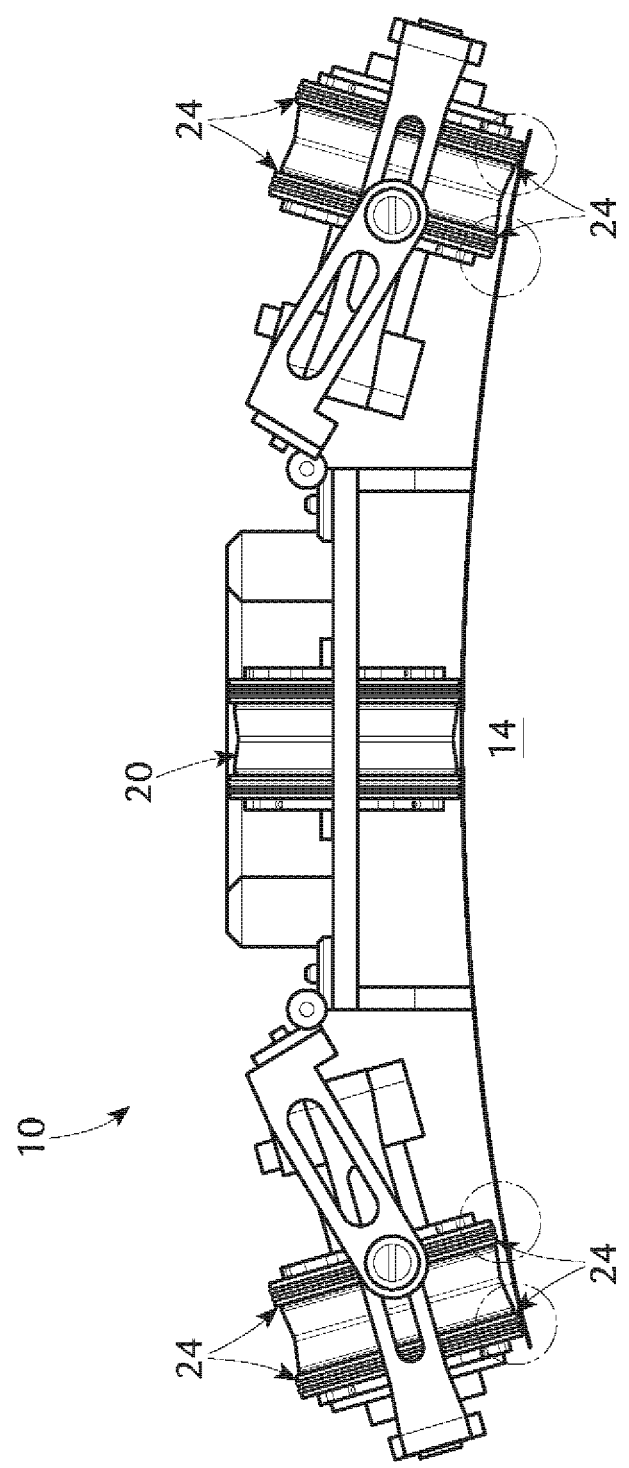
FIG. 5 is a diagrammatic front elevational view of the robotic device with the middle wheel on a curved surface, while the inner of the side drive wheels of the drive modules are lifted.

As shown in FIG. 5, hinging the magnetic side drive wheel 24 from the side requires only one axis of rotation that is parallel to the trajectory of the magnetic side drive wheel 24 if the surface that it is driving on is flat or curved with one specific radius of rotation.

Figure 6:
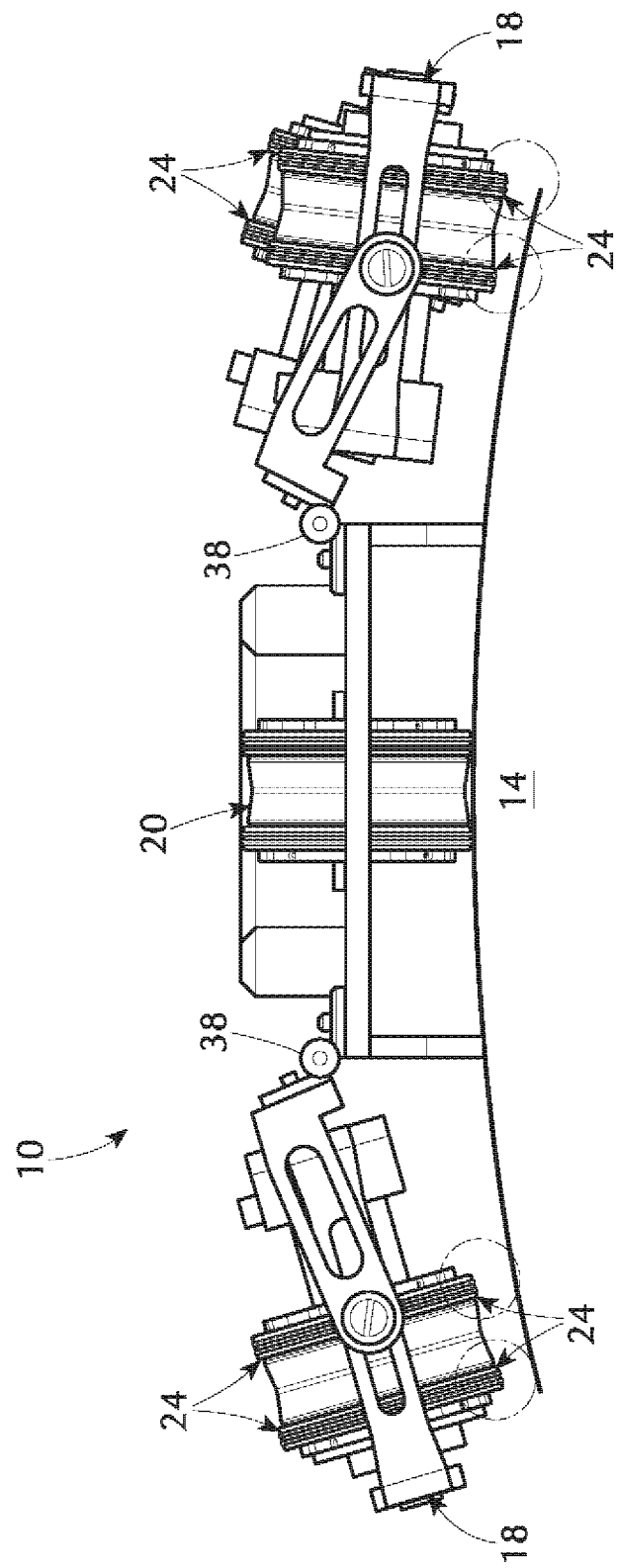
FIG. 6 is a diagrammatic front elevational view of the robotic device with the middle wheel on a curved surface, while the first hinge is allowing both of the side drive wheels of the drive modules to be lifted from the curved surface, respectively.

As shown in FIG. 6, when moving on the curved ferromagnetic surface 14 that has a changing radius, such as, the case when pivoting around a cylindrical surface, for example, whereby the radius of the curvature, the first yoke 28 of the magnetic side drive wheel 24 and the second yoke 30 of the magnetic side drive wheel 24 are normal to its changing.

For such cases, an additional degree of freedom is required in the form of a rotation action around an axis that is parallel to the other axis of rotation provided by the first hinge 38. Having the first hinge 38 and a second hinge 48 in that specific mounting angle allows the passive normalization of the magnetic side drive wheels 24 around different curvatures of various radii that cannot be achieved with only the first hinge 38.

When using only the first hinge 38, the magnetic side drive wheel 24 touches the curved ferromagnetic surface 14 with the first yoke 28 only—first yoke 28 in the case of a convex surface and the second yoke 30 in the case of a concave surface. The other yoke only comes in contact with the curved ferromagnetic surface 14 at one specific radius unless the second hinge 48 is implemented.

A resulting magnetic pull force is only be maximized when the entire middle wheel 20 is perfectly perpendicular to the curved ferromagnetic surface 14 with no air gap between the at least one of the first yoke 28, the second yoke 30, and a surface leading to a hugging effect of the chassis platform 16 to the curved ferromagnetic surface 14.

For example, as shown in FIG. 5, the robotic device 10 is with the middle wheel 20 on the curved ferromagnetic surface 14, while the inner of the magnetic side drive wheels 24 of the at least one magnetic side drive module 18 are lifted.

As shown in FIG. 6, the robotic device 10 is with the middle wheel 20 on the curved ferromagnetic surface 14, while the first hinge 38 is allowing both of the magnetic side drive wheels 24 of the at least one magnetic side drive module 18 to be lifted from the curved ferromagnetic surface 14.

Figure 7:
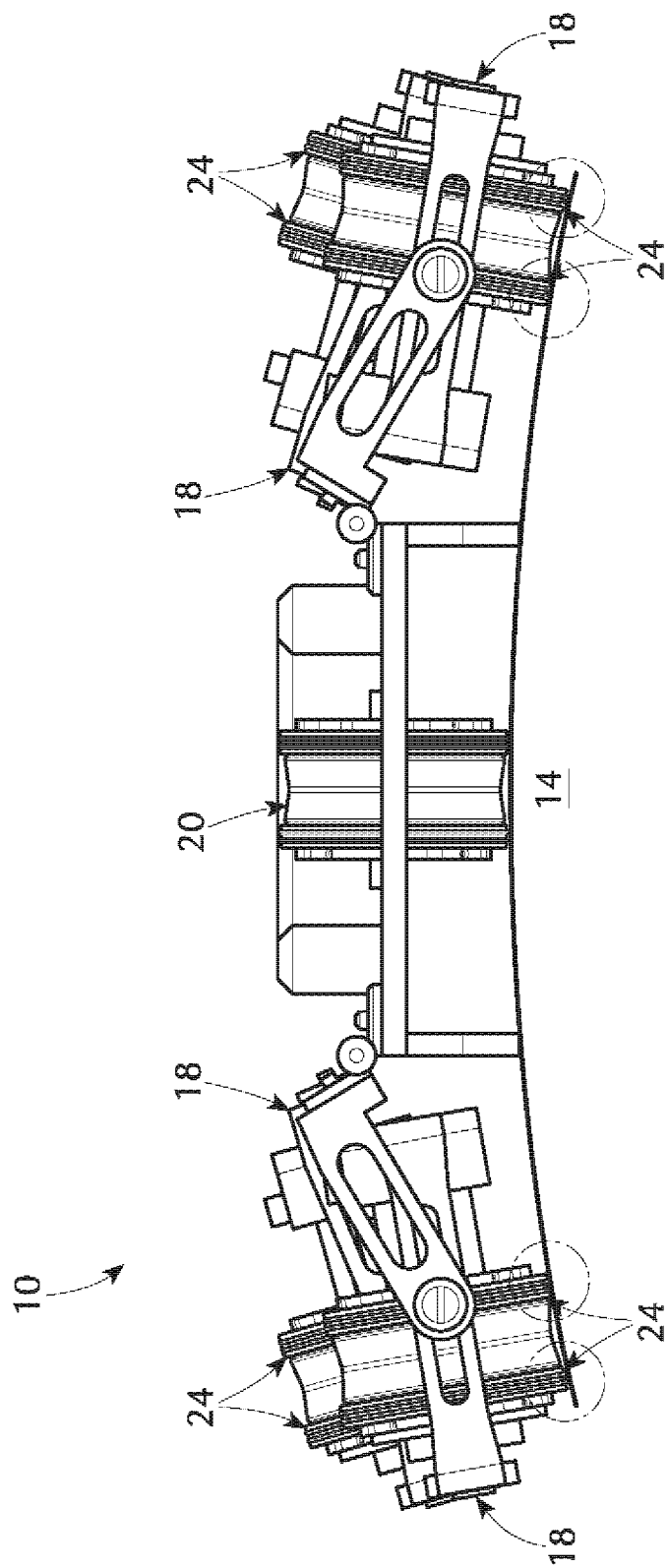
FIG. 7 is a diagrammatic front elevational view of the robotic device with the middle wheel on a curved surface and both of the side drive wheels of the drive modules touching the curved surface of each drive module.
Figure 11:
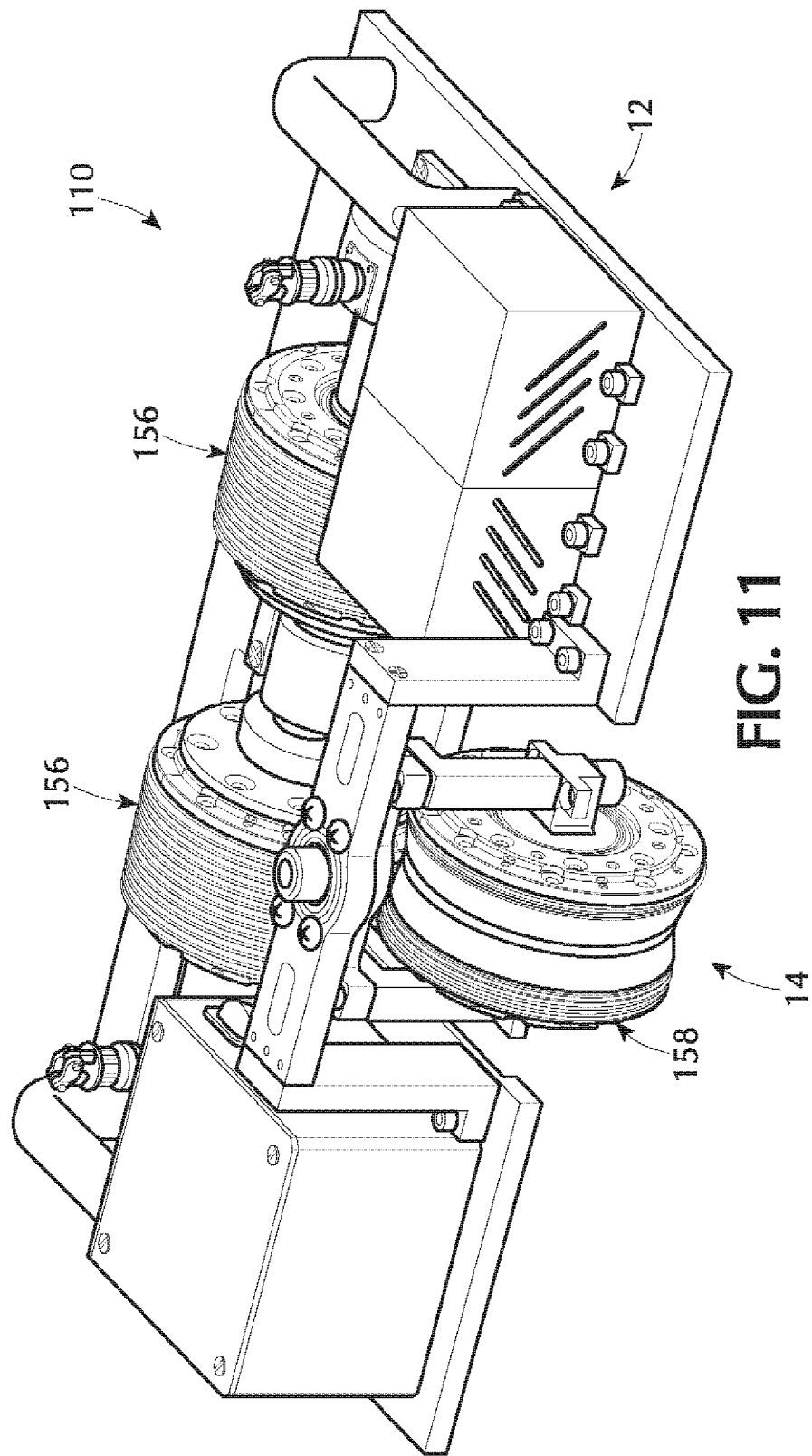
FIG. 11 is a diagrammatic rear perspective view of an alternate embodiment of the robotic device.
Figure 12:
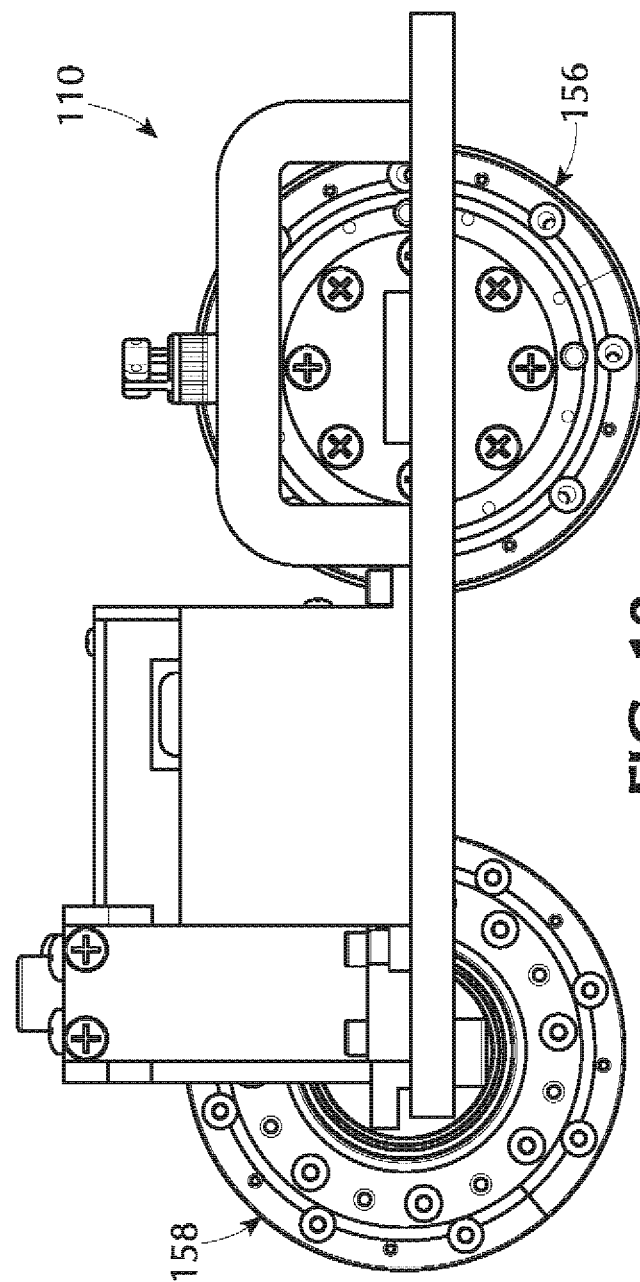
FIG. 12 is an enlarged diagrammatic side view taken in the direction of ARROW 12 in FIG. 11 of the alternate embodiment of the robotic device.
Figure 13:
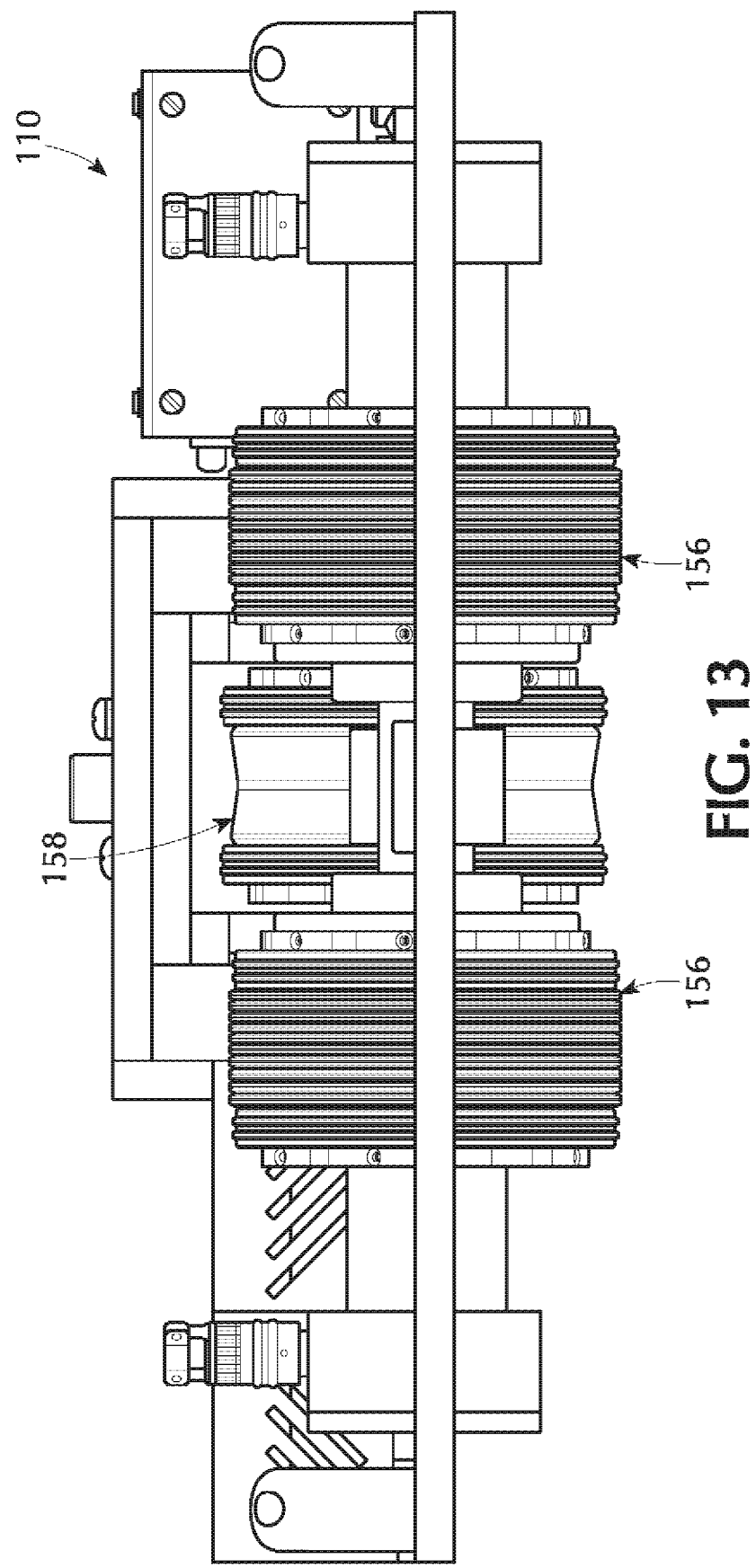
FIG. 13 is an enlarged diagrammatic front elevational view taken in the direction of ARROW 13 in FIG. 10 of the alternate embodiment of the robotic device.
Figure 14:
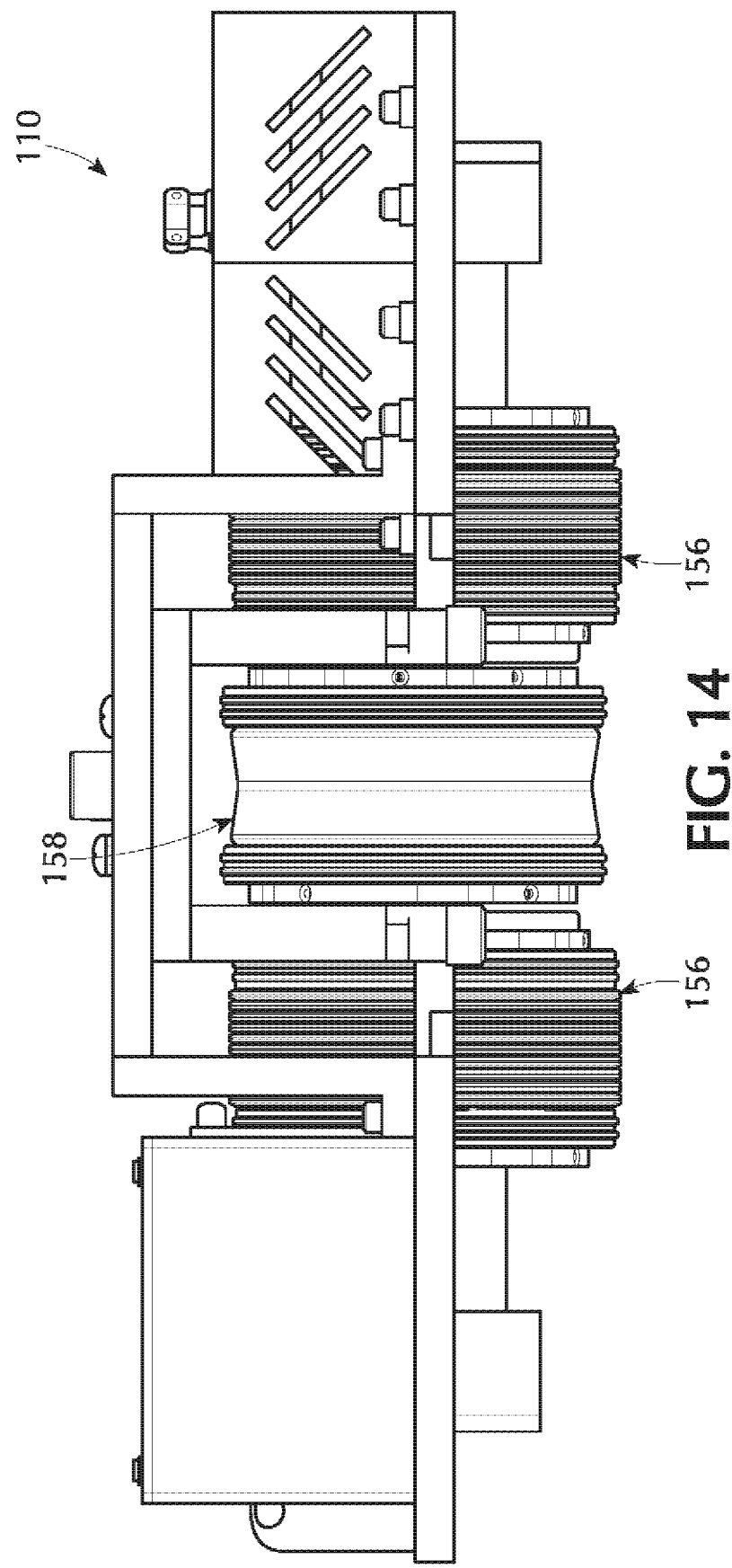
FIG. 14 is an enlarged diagrammatic rear elevational view taken in the direction of ARROW 14 in FIG. 11 of the alternate embodiment of the robotic device.

As shown in FIG. 7, the robotic device 10 is with the middle wheel 20 on the curved ferromagnetic surface 14 and both of the magnetic side drive wheels 24 of the at least one magnetic side drive module 18 touching the curved ferromagnetic surface 14.

Accessories

As shown in FIGS. 8 and 9, one or more metallic wire brushes 50 is actuated by a high-speed motor 52 to remove rust and old paint from the tower. Suction mechanisms 54 are used to collect the debris paint and rust.

First Alternate Embodiment of the Robotic Device 110

The alternate embodiment can best be seen in FIGS. 10, 11, 12, 13, and 14. The alternate embodiment of the robotic device 110 has two actuated magnetic wheels 156 and one passive magnetic caster wheel 158 that follows the trajectory of the two actuated magnetic wheels 156.

Figure 15:
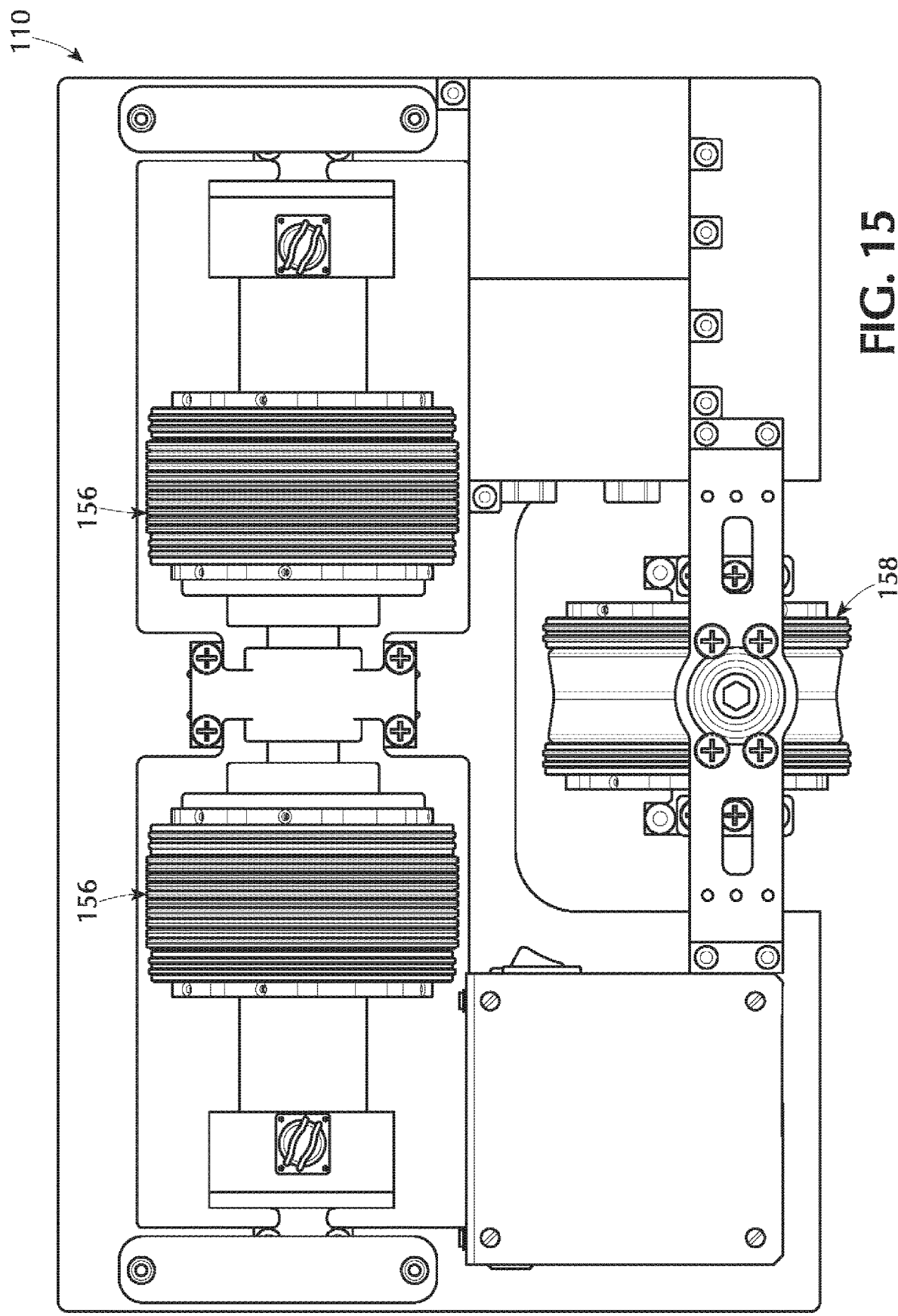
FIG. 15 is a diagrammatic top plan view of the alternate embodiment of the robotic device in the forward direction with the one passive magnetic caster wheel in one direction.
Figure 16:
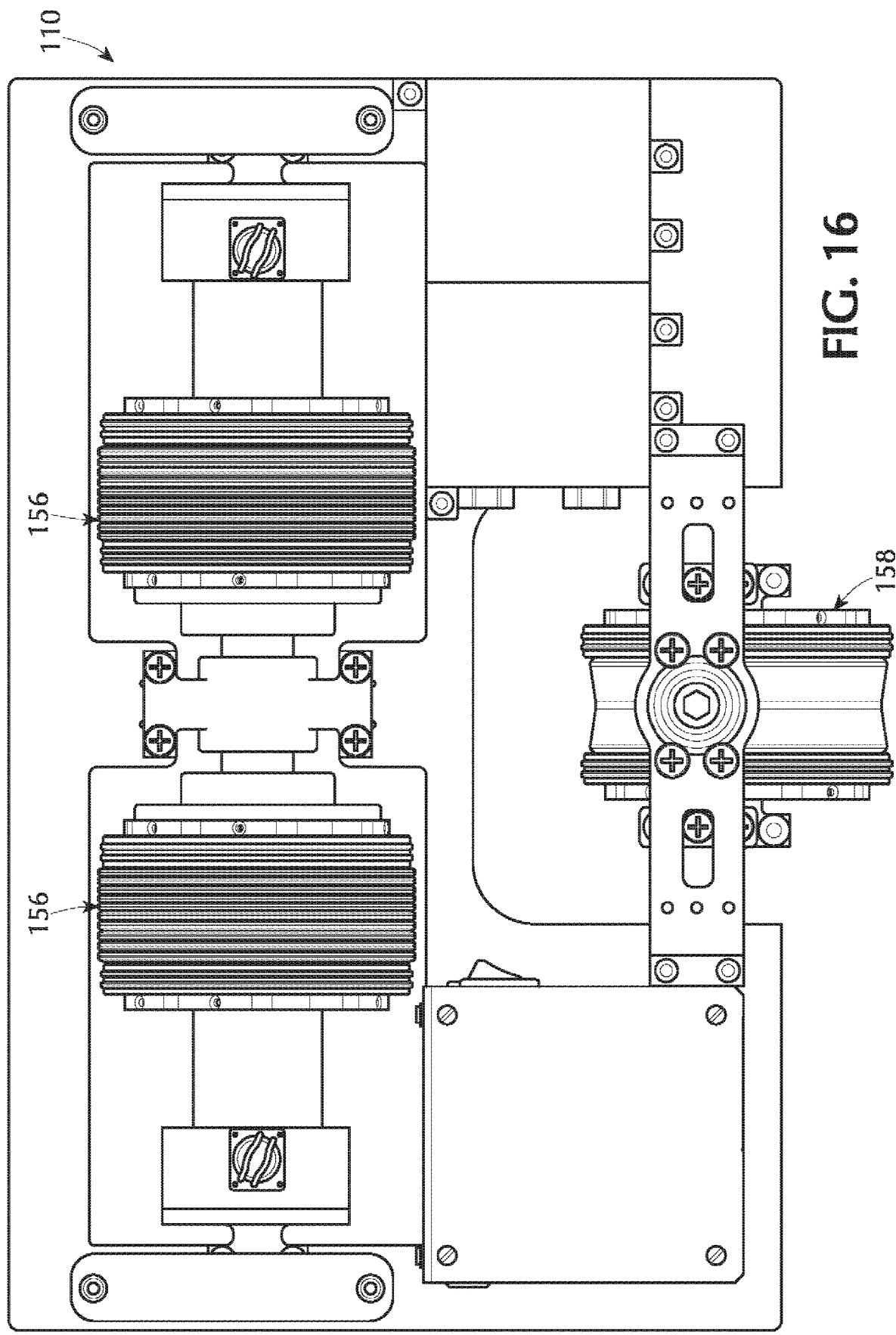
FIG. 16 is a diagrammatic top plan view of the alternate embodiment of the robotic device in the reverse direction with the one passive magnetic caster wheel in the opposite direction.

As shown in FIGS. 15 and 16, the one passive magnetic caster wheel 158 is off-centered and allowed to rotate (roll) around its axis of rotation while also given the freedom to pivot around a second axis that is orthogonal to the surfaces its traverses. Without this second axis the robot device 110 would not steer and pivot without scratching the surface underneath or at least reduce the resistance that this causes and ultimately reduce energy consumption and current spikes on the two actuated magnetic wheels 156 that drive the actuated motors.

The robot device 110 works like a tank in terms of driving forward and backward by actuating the two actuated magnetic wheels 156 simultaneously or steer by actuating each wheel of the two actuated magnetic wheels 156 to move in opposing directions.

As shown in FIG. 15, when moving forward the one passive magnetic caster wheel 158 will follow, and as shown in FIG. 16, when moving backward the one passive magnetic caster wheel 158 pivots 180° and follow as well.

Figure 17:
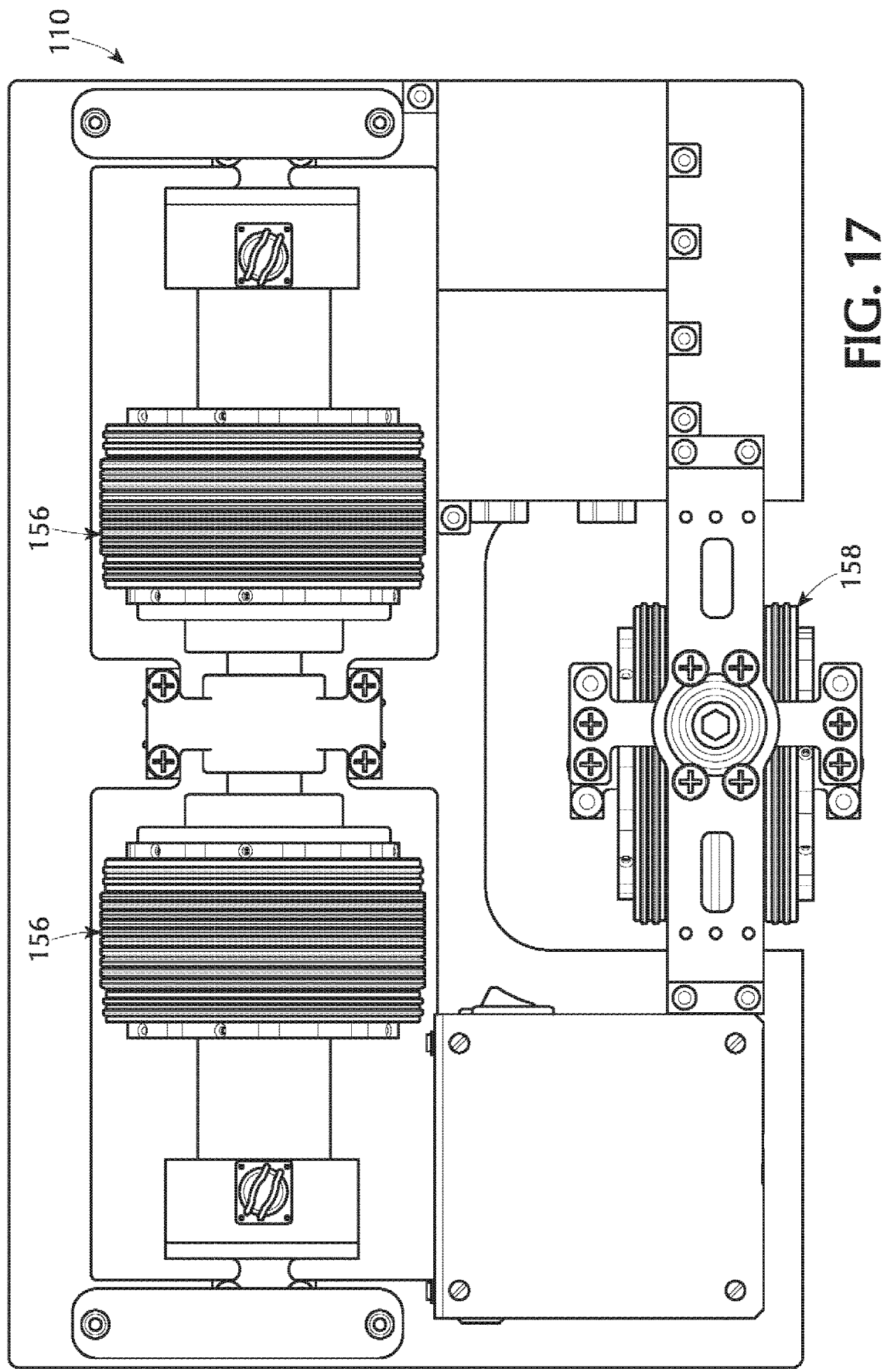
FIG. 17 is a diagrammatic top plan view of the alternate embodiment of the robotic device showing the one passive magnetic caster wheel pivoted to full pivot.
Figure 18:
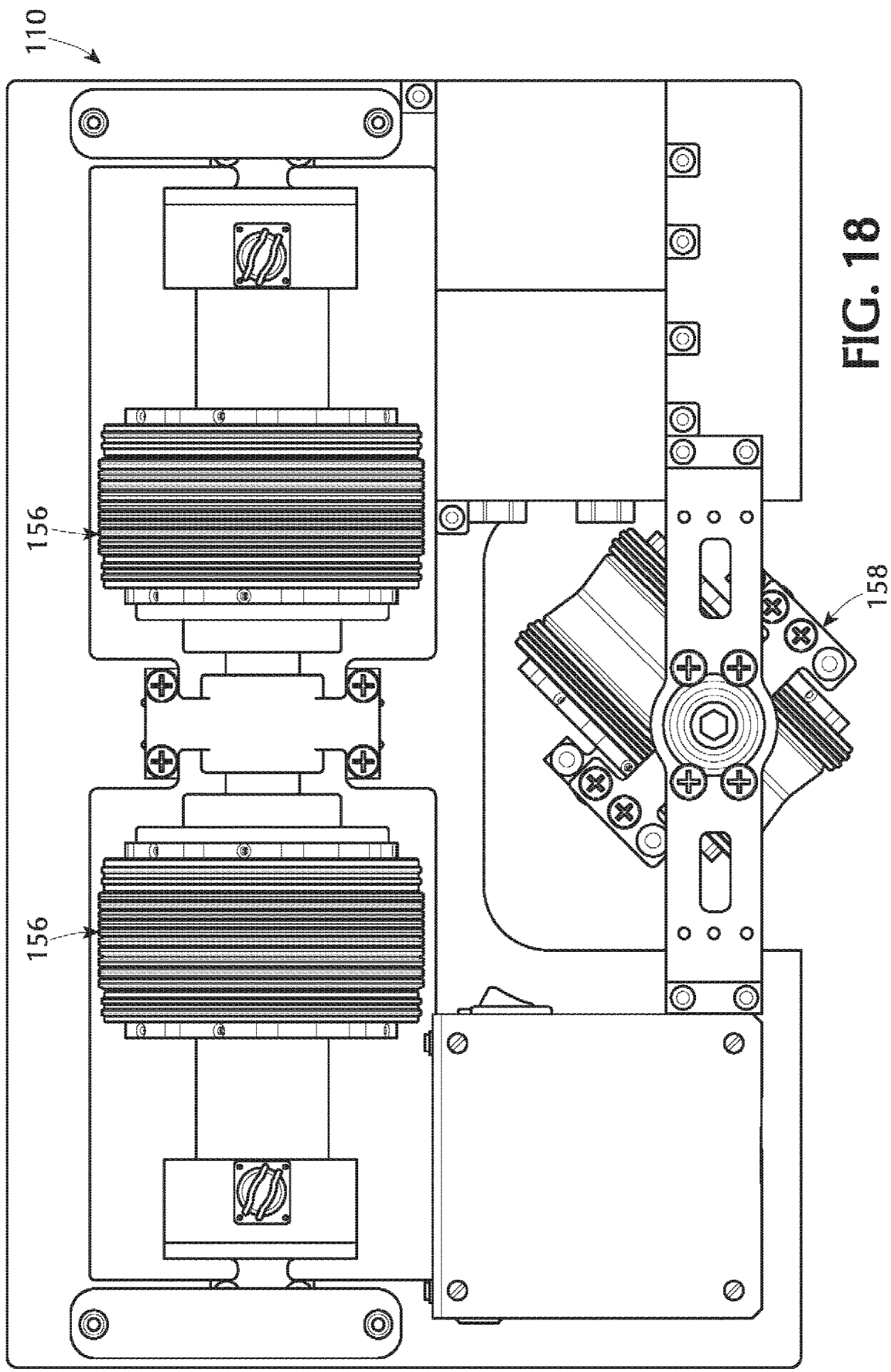
FIG. 18 is a diagrammatic top plan view of the alternate embodiment of the robotic device showing the one passive magnetic caster wheel partially pivoted.
Figure 21:
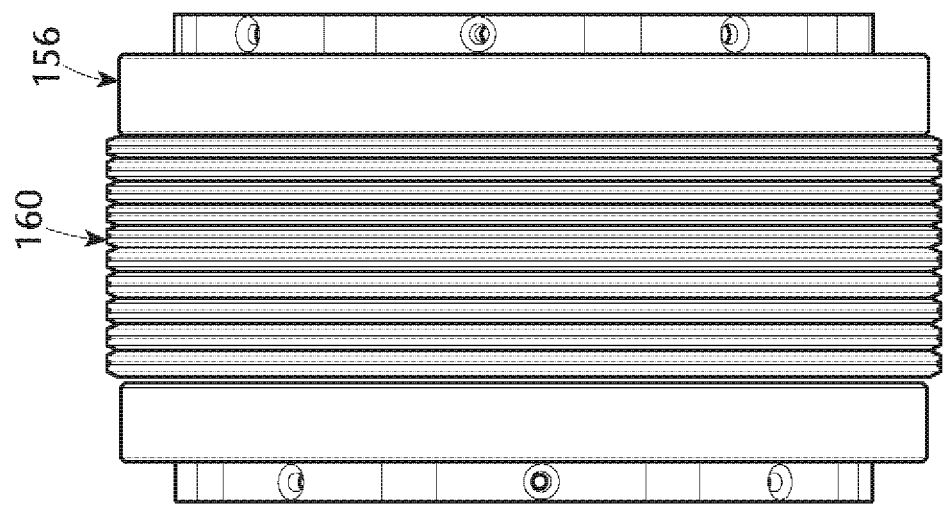
FIG. 21 is a diagrammatic front elevational view taken in the direction of ARROW 21 in FIG. 20 of the one passive magnetic caster wheel.
Figure 20:
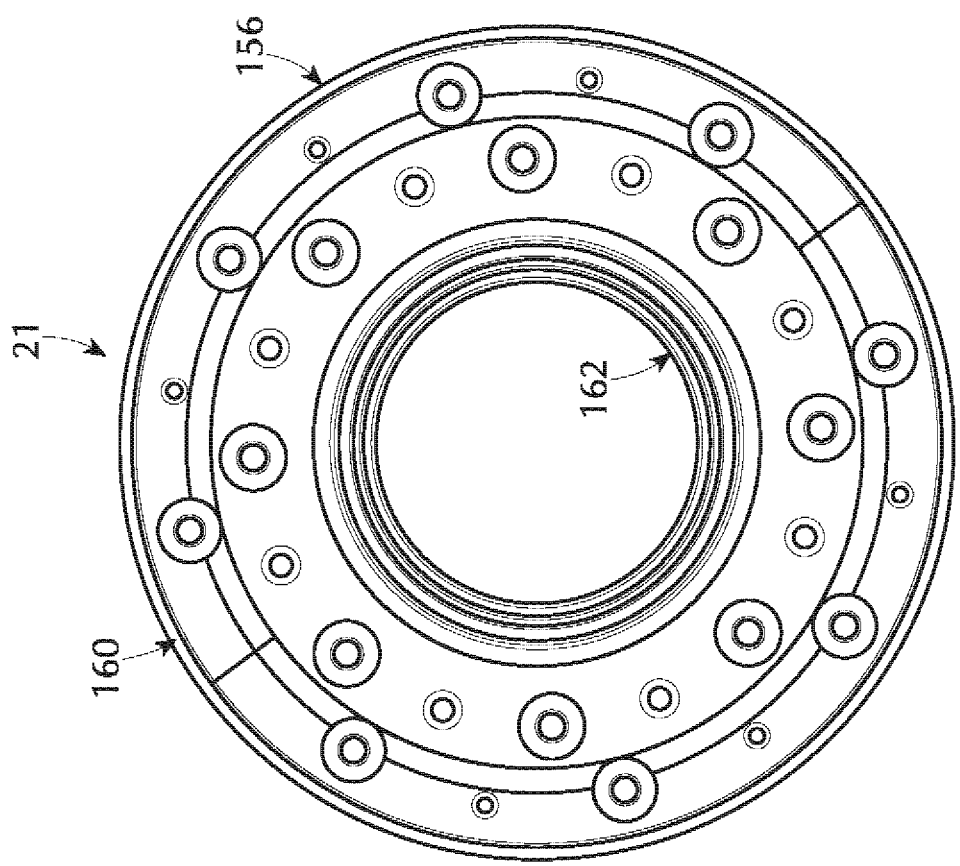
FIG. 20 is a diagrammatic side elevational view taken in the direction of ARROW 20 in FIG. 19 of the one passive magnetic caster wheel.

As shown in FIGS. 17 and 18, when the robot device 110 is steering or pivoting, the one passive magnetic caster wheel 158 orients itself to have its center of rotation be orthogonal to the two actuated magnetic wheels 156 passively.

As shown in FIGS. 19, 20, 21, and 22, the two actuated magnetic wheels 156 are rubberized 160 in the middle or on the sides, however, the rubber 160 (or any other polymer with a high coefficient of friction) thickness affects the magnetic adhesive force of the two actuated magnetic wheels 156 and create a separation.

The resulting adhesive force of the two actuated magnetic wheels 156 is proportional to the inverse cube of the separation between the ferromagnetic yokes and the surface. A thin layer of rubber 160 gets consumed quickly and while a thick one helps in traction it, also significantly diminishes the adhesive force. Rubberizing 160 the two actuated magnetic wheels 156 in the middle alleviate this compromise by allowing the steel yokes to be fairly close to the surface while having an adequate thickness of the rubber 160 in the middle of each of the two actuated magnetic wheels 156 above the non-magnetic hub 162. This layer of rubber 160 is epoxied (glued) to the non-magnetic hub 162 or attached by fasteners for easier replacement(s) after wearing out.

Furthermore, the rubber layer 160 gets squished by the adhesive force of each of the two actuated magnetic wheels 156. The design of the rubber 160 thickness and outer diameter of the layer with respect to the outer diameter of the yokes is crucial in ensuring maximum adhesive force while preventing these yokes from touching the traversed surface. The squishiness of the rubber 160 when adjusting on curved ferromagnetic surfaces, especially when these surfaces are for a giant structure, such as a water tower or oil tanks, where the surface is treated as if it has an infinite diameter, i.e., flat due to its large diameter when compared with the size of the robot device 110.

Last and not least, the one passive magnetic caster wheel 158 acts as a third wheel to ensure stability (prevent rocking) while helping to carry the robot device 110 and its payload being a third magnetic wheel. The carrying capacity of the third wheel allows for more safe climbing by increasing the factor of safety of the robot adhesive force.

If rubberized 160, the two actuated magnetic wheels 156 do not have to be with freely rotating yokes, since they are not in direct contact with the traversed surface, but rather it is the rubber 160 that directly contacts it and so the two yokes are locked together.

The one passive magnetic caster wheel 158 is replaceable with an omnidirectional wheel or a magnetic omnidirectional wheel (Omni-wheel) to provide that intent or rolling when driving and sliding when steering or the other way around.

Second Alternate Embodiment of the Robotic Device

The one passive magnetic caster wheel is actuated to pivot during steering instead of being passive, but the passive option reduces a need for an extra actuator.

Furthermore, the two actuated magnetic wheels have the original double hinge option, while putting a ball caster in the one passive magnetic caster wheel allows more adhesion to curved steel surfaces. Testing has shown, however, that there is a need for another point of contact in the form of an additional caster wheel that is or is not magnetic. The sole purpose would be to prevent rocking of the chassis around the axis of rotation of the middle wheel if it is the driving, forward or backward, configuration.

Four wheels are actuated, but again the one passive magnetic caster wheel is on a caster and an additional caster wheel—not necessarily magnetic—is advised to ensure the stability of the robotic device.

IMPRESSIONS

It will be understood that each of the elements described above, or two or more together, may also find a useful application in other types of constructions differing from the types described above.

While the embodiments of the present invention have been illustrated and described as embodied in a robotic device for conducting an action on a curved ferromagnetic surface, nevertheless, they are not limited to the details shown, since it will be understood that various omissions, modifications, substitutions, and changes in the forms and details of the embodiments of the present invention illustrated and their operation can be made by those skilled in the art, without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A robotic device for conducting an action on a curved ferromagnetic surface, comprising:
    an actuating motor;
    a chassis platform;
    a magnetic side drive wheel having a first yoke and a second yoke; and,
    a magnetic side drive module comprising a magnetic wheel coupled to said actuating motor with said actuating motor being disposed to a far side of said first yoke of said magnetic side drive wheel, said second yoke of said magnetic side drive wheel is one of coupled and decoupled for passively rotating with respect to said first yoke of said magnetic side drive wheel, said magnetic side drive module further comprising ring magnets disposed inside said magnetic side drive wheel between said first yoke and said second yoke of said magnetic side drive wheel;
    wherein in order to favor attraction to said first yoke over said second yoke of said magnetic side drive wheel, said ring magnets of said magnetic side drive wheel are pushed toward said first yoke of said magnetic side drive wheel via spherical balls directly pressed with screws or spring loaded for ensuring a gap between said second yoke of said magnetic side drive wheel and said ring magnets;
    wherein said chassis platform is for traversing the curved ferromagnetic surface, and is maintained thereon, by virtue of the curved ferromagnetic surface being ferromagnetic;
    wherein said at least one magnetic side drive module is pivotally attached to said chassis platform; and wherein said at least one drive module is for conducting the action on the curved ferromagnetic surface as said chassis platform rolls on the curved ferromagnetic surface.

2. The robotic device of claim 1, wherein said chassis platform has an additional magnetic wheel.

3. The robotic device of claim 2, wherein said additional magnetic wheel of said chassis platform is passively mounted to rotate in a same direction as wheels of said at least one magnetic side drive module as they roll on the curved ferromagnetic surface.

4. The robotic device of claim 2, wherein said additional magnetic wheel is mounted to pivot around its middle axis that is perpendicular to the curved and ferromagnetic surface that it adheres to while also rolling on the curved and ferromagnetic surface.

5. A robotic device for conducting an action on a curved ferromagnetic surface, comprising:
    an actuating motor;
    a chassis platform;
    a magnetic side drive wheel having a first yoke and a second yoke, said magnetic side drive wheel is mounted on a first bracket that pivots with respect to a second bracket via a hinge on a first axis of rotation, said second bracket is also hinged from a far side to pivot around a second axis of rotation; and,
    a magnetic side drive module comprising a magnetic wheel coupled to said actuating motor with said actuating motor being disposed to a far side of said first yoke of said magnetic side drive wheel, said second yoke of said magnetic side drive wheel is one of coupled and decoupled for passively rotating with respect to said first yoke of said magnetic side drive wheel;
    wherein said chassis platform is for traversing the curved ferromagnetic surface, and is maintained thereon, by virtue of the curved ferromagnetic surface being ferromagnetic;
    wherein said at least one magnetic side drive module is pivotally attached to said chassis platform; and wherein said at least one drive module is for conducting the action on the curved ferromagnetic surface as said chassis platform rolls on the curved ferromagnetic surface.

6. The robotic device of claim 2, wherein by adding said additional magnetic wheel load carrying capacity of said chassis platform increases.

7. The robotic device of claim 2, wherein said additional magnetic wheel is intended to set height of said chassis platform while preventing sagging in its middle, which allows said chassis platform to carry different functional modules that include cleaning, surface preparation, painting, coating, inspection, and welding jobs.

8. The robotic device of claim 5, wherein said first axis of rotation and said second axis of rotation are parallel to each other forcing said first bracket and said second bracket to pivot in a same vertical plane.

9. The robotic device of claim 1, wherein said chassis platform cleans and paints/coats water towers, both internally and externally, by virtue of said chassis platform being light enough to be deployed by an operator who controls it remotely, while it is crawling on top of the curved and ferromagnetic surface.

10. The robotic device of claim 1, wherein said chassis platform is one of tethered and wireless.

11. The robotic device of claim 10, wherein said wireless of said chassis platform offers ease of navigation.

12. The robotic device of claim 10, wherein said tethered of said chassis platform allows carrying at least one of a jet of media, a blast of air, water for cleaning, and a continuous supply of paint for coating and painting.

13. The robotic device of claim 10, wherein said tethered of said chassis platform eliminates a need to have any power source on board of said chassis platform, as it is used to provide power and communication in addition to cleaning and painting material.

14. The robotic device of claim 10, wherein said wireless of said chassis platform is a completely self-contained device with interchangeable modules for various functions, but is constrained and limited by how much load said robotic device can carry.

15. The robotic device of claim 1, wherein paint is provided from a storage container that is one of on-board and tethered.

16. The robotic device of claim 1, wherein said ring magnets of said magnetic side drive module are attracted to said first yoke of said magnetic side drive wheel.

17. The robotic device of claim 1, wherein said magnetic side drive wheel is mounted on a first bracket that pivots with respect to a second bracket via a hinge on an axis of rotation.

18. The robotic device of claim 1, wherein when moving on the curved ferromagnetic surface that has a changing radius, said first yoke of said magnetic side drive wheel and said second yoke of said magnetic side drive wheel are normal to its changing.

19. The robotic device of claim 1, wherein said second yoke only comes in contact with the curved ferromagnetic surface at one specific radius unless said second hinge is implemented.

20. The robotic device of claim 1, wherein a resulting magnetic pull force is only maximized when said entire magnetic side drive wheel is perfectly perpendicular to the curved ferromagnetic surface with no air gap between said first yoke, said second yoke, and a surface leading to a hugging effect of said chassis platform to the curved ferromagnetic surface.

21. The robotic device of claim 1, further comprising:
at least one metallic wire brush; and
a high-speed motor; wherein said at least one metallic wire brush is actuated by said high-speed motor to remove rust and old paint from an area.

22. The robotic device of claim 21, further comprising: suction mechanisms; and wherein said suction mechanisms are used to collect debris paint and rust.

23. The robotic device of claim 1, wherein said robotic device has: a) two actuated magnetic wheels; and b) one passive magnetic caster wheel; wherein said one passive magnetic caster wheel follows a trajectory of said two actuated magnetic wheels.

24. The robotic device of claim 23, wherein said one passive magnetic caster wheel is off-centered and allowed to rotate around its axis of rotation while also given freedom to pivot around a second axis that is orthogonal to the surface it traverses; and wherein without said second axis, said robot device cannot steer and pivot without scratching the surface underneath or at least reduce resistance that this causes and ultimately reduce energy consumption and current spikes on said two actuated magnetic wheels that drive actuated motors.

25. The robotic device of claim 23, wherein said robot device works like a tank in terms of driving forward and backward by actuating said two actuated magnetic wheels simultaneously or steer by actuating each wheel of said two actuated magnetic wheels to move in opposing directions.

26. The robotic device of claim 23, wherein when moving forward said one passive magnetic caster wheel follows, and when moving backward said one passive magnetic caster wheel pivots 180° to follow as well.

27. The robotic device of claim 23, wherein when said robot device is steering or pivoting, said one passive magnetic caster wheel orients itself to have its center of rotation orthogonal to said two actuated magnetic wheels passively.

28. The robotic device of claim 23, wherein said two actuated magnetic wheels are rubberized in the middle or on its sides, however, said rubber or any other polymer with a high coefficient of friction thickness affects magnetic adhesive force of said two actuated magnetic wheels and create a separation.

29. The robotic device of claim 28, wherein resulting adhesive force of said two actuated magnetic wheels is proportional to an inverse cube of said separation between said ferromagnetic yokes and the surface; wherein a thin layer of rubber gets consumed quickly and while a thick one helps in traction, it also significantly diminishes the adhesive force; wherein rubberizing said two actuated magnetic wheels in middle alleviates this compromise by allowing said steel first and second yokes to be fairly close to the surface while having an adequate thickness of said rubber in said middle of each of said two actuated magnetic wheels above its non-magnetic hub; and wherein said layer of rubber is secured to said non-magnetic hub or attached by fasteners allowing for replacement after wearing out.

30. The robotic device of claim 28, wherein said rubber layer gets squished by adhesive force of each of said two actuated magnetic wheels; wherein said rubber thickness and outer diameter of said rubber layer with respect to an outer diameter of said first and second yokes is crucial in ensuring maximum adhesive force while preventing said first and second yokes from touching the traversed surface; wherein said squishiness of said rubber when adjusting on curved ferromagnetic surfaces, especially when these surfaces are for a giant structure, the surface is treated as if it has an infinite diameter as a result of its large diameter when compared with its size of said robot device.

31. The robotic device of claim 30, wherein said one passive magnetic caster wheel acts as a third wheel to ensure stability to prevent rocking while helping to carry said robot device and its payload; and wherein carrying capacity of said third magnetic wheel allows for more safe climbing by increasing a factor of safety of said adhesive force.

32. The robotic device of claim 28, wherein if rubberized, said two actuated magnetic wheels do not have to have freely rotating said first and second yokes, since they are not in direct contact with the traversed surface, but rather it is said rubber that directly contacts the traversed surface and so said first and second yokes are locked together.

33. The robotic device of claim 23, wherein said one passive magnetic caster wheel is replaceable with an omni-directional wheel or a magnetic omnidirectional wheel/ Omni-wheel to provide rolling when driving and sliding when steering or the other way around.

34. The robotic device of claim 23, wherein said one passive magnetic caster wheel is actuated to pivot during steering instead of being passive, but when passive a need for an extra actuator is reduced.

35. The robotic device of claim 23, wherein said two actuated magnetic wheels have a double hinge option, while putting a ball caster in said one passive magnetic caster wheel allows more adhesion to the curved steel surfaces; and wherein there is a need for another point of contact in a form of an additional caster wheel that is or is not magnetic to prevent rocking of the chassis platform around axis of rotation of said one passive magnetic caster wheel if it is in a driving, forward or backward, configuration.

36. The robotic device of claim 23, wherein when four actuated magnetic wheels are actuated, said one passive magnetic caster wheel is on a caster and an additional caster for ensuring stability of said robotic device.

37. The robotic device of claim 5, wherein said magnetic side drive wheel pivots around a third axis of rotation that is perpendicular to said first axis of rotation and to said second axis of rotation.

38. The robotic device of claim 5, wherein hinging said magnetic side drive wheel from a side requires only said first axis of rotation that is parallel to a trajectory of said magnetic side drive wheel if said curved ferromagnetic surface that it is driving on is flat or curved with one specific radius of rotation.

39. The robotic device of claim 5, wherein when moving on the curved ferromagnetic surface that has a changing radius, an additional degree of freedom is required in a form of a rotation action around an axis that is parallel to said second axis of rotation provided by said hinge.

40. A robotic device for conducting an action on a curved ferromagnetic surface, comprising:
   an actuating motor;
   a chassis platform;
   a magnetic side drive wheel having a first yoke and a second yoke, said magnetic side drive wheel is mounted on a first bracket that pivots with respect to a second bracket via a hinge on an axis of rotation, wherein said axis of rotation is as close as possible to a middle symmetrical plane of said magnetic side drive wheel between said first yoke and said second yoke of said magnetic side drive wheel; and,
   a magnetic side drive module comprising a magnetic wheel coupled to said actuating motor with said actuating motor being disposed to a far side of said first yoke of said magnetic side drive wheel, said second yoke of said magnetic side drive wheel is one of coupled and decoupled for passively rotating with respect to said first yoke of said magnetic side drive wheel;
   wherein said chassis platform is for traversing the curved ferromagnetic surface, and is maintained thereon, by virtue of the curved ferromagnetic surface being ferromagnetic;
   wherein said at least one magnetic side drive module is pivotally attached to said chassis platform; and wherein said at least one drive module is for conducting the action on the curved ferromagnetic surface as said chassis platform rolls on the curved ferromagnetic surface.

41. A robotic device for conducting an action on a curved ferromagnetic surface, comprising:
   an actuating motor;
   a chassis platform;
   a magnetic side drive wheel having a first yoke and a second yoke, said magnetic side drive wheel is mounted on a first bracket that pivots with respect to a second bracket via a hinge on an axis of rotation; and,
   a magnetic side drive module comprising a magnetic wheel coupled to said actuating motor with said actuating motor being disposed to a far side of said first yoke of said magnetic side drive wheel, said second yoke of said magnetic side drive wheel is one of coupled and decoupled for passively rotating with respect to said first yoke of said magnetic side drive wheel, wherein said magnetic side drive module is hinged to said chassis platform having said magnetic side drive module mounted on each side and connected to a hinge;
   wherein said chassis platform is for traversing the curved ferromagnetic surface, and is maintained thereon, by virtue of the curved ferromagnetic surface being ferromagnetic;
   wherein said at least one magnetic side drive module is pivotally attached to said chassis platform; and wherein said at least one drive module is for conducting the action on the curved ferromagnetic surface as said chassis platform rolls on the curved ferromagnetic surface.

42. The robotic device of claim 41, wherein having said hinge and an additional hinge allow a passive normalization of said magnetic side drive wheels around different curvatures of various radii that cannot be achieved with only said hinge.

43. The robotic device of claim 41, wherein when using only said hinge, said magnetic side drive wheel touches the curved ferromagnetic surface with said first yoke only.

44. A robotic device for conducting an action on a curved ferromagnetic surface, comprising:
   an actuating motor;
   a chassis platform;
   a magnetic side drive wheel having a first yoke on a convex surface and a second yoke on a concave surface; and,
   a magnetic side drive module comprising a magnetic wheel coupled to said actuating motor with said actuating motor being disposed to a far side of said first yoke of said magnetic side drive wheel, said second yoke of said magnetic side drive wheel is one of coupled and decoupled for passively rotating with respect to said first yoke of said magnetic side drive wheel;
   wherein said chassis platform is for traversing the curved ferromagnetic surface, and is maintained thereon, by virtue of the curved ferromagnetic surface being ferromagnetic;
   wherein said at least one magnetic side drive module is pivotally attached to said chassis platform; and wherein said at least one drive module is for conducting the action on the curved ferromagnetic surface as said chassis platform rolls on the curved ferromagnetic surface.

* * * * *